United States Patent
Shih et al.

(10) Patent No.: US 11,317,446 B2
(45) Date of Patent: *Apr. 26, 2022

(54) METHOD AND APPARATUS OF HANDLING BWP INACTIVITY TIMER DURING RANDOM ACCESS PROCEDURE IN A WIRELESS COMMUNICATION SYSTEM

(71) Applicant: ASUSTek Computer Inc., Taipei (TW)

(72) Inventors: Tun-Huai Shih, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,682

(22) Filed: Sep. 17, 2020

(65) Prior Publication Data
US 2021/0007150 A1 Jan. 7, 2021

Related U.S. Application Data

(63) Continuation of application No. 16/158,683, filed on Oct. 12, 2018.

(Continued)

(51) Int. Cl.
*H04W 74/08* (2009.01)
*H04W 16/32* (2009.01)
(Continued)

(52) U.S. Cl.
CPC ...... *H04W 74/0833* (2013.01); *H04W 16/32* (2013.01); *H04W 72/042* (2013.01);
(Continued)

(58) Field of Classification Search
CPC ............ H04W 72/042; H04W 16/32; H04W 74/0833; H04W 74/004; H04W 88/02; H04W 72/14; H04W 72/1289
See application file for complete search history.

(56) References Cited

U.S. PATENT DOCUMENTS

2019/0097874 A1* 3/2019 Zhou .................. H04L 5/0023
2019/0109688 A1* 4/2019 Kim .................. H04W 74/0841

OTHER PUBLICATIONS

3GPP Standard; Technical Specification; 3GPP TS 38.321, 3rd Generation Partnership Project (3GPP), Mobile Competence Centre; 650, Route Des Lucioles ; F-06921 Sophia-Anti Polis Cedex; France, vol. RAN WG2, No. V2.0.0, Dec. 11, 2017 (Dec. 11, 2017), pp. 1-55, XP051391867 (Year: 2017).*

* cited by examiner

Primary Examiner — Mehmood B. Khan
(74) Attorney, Agent, or Firm — Skaar Ulbrich Macari, P.A.

(57) ABSTRACT

Methods and apparatuses of handling a bandwidth part (BWP) inactivity timer during a Random Access procedure in a wireless communication system are disclosed herein. In one method, a user equipment (UE) starts a BWP timer for a serving cell operating in a paired spectrum. The UE initiates a contention-based Random Access (RA) procedure on the serving cell and stops the BWP timer. The UE starts the BWP timer upon successful completion of the RA procedure, wherein the UE considers the contention-based RA procedure successfully completed if a Physical Downlink Control Channel (PDCCH) addressed to a Cell Network Temporary Identifier (C-RNTI) of the UE is received and the PDCCH contains an uplink grant for a new transmission.

18 Claims, 7 Drawing Sheets

Related U.S. Application Data

(60) Provisional application No. 62/598,078, filed on Dec. 13, 2017.

(51) Int. Cl.
*H04W 72/04* (2009.01)
*H04W 74/00* (2009.01)
*H04W 88/02* (2009.01)
*H04W 72/14* (2009.01)
*H04W 72/12* (2009.01)

(52) U.S. Cl.
CPC ...... *H04W 74/004* (2013.01); *H04W 72/1289* (2013.01); *H04W 72/14* (2013.01); *H04W 88/02* (2013.01)

METHOD AND APPARATUS OF HANDLING BWP INACTIVITY TIMER DURING RANDOM ACCESS PROCEDURE IN A WIRELESS COMMUNICATION SYSTEM

CROSS-REFERENCE TO RELATED APPLICATIONS

The present application is a Continuation of U.S. patent application Ser. No. 16/158,683, filed Oct. 12, 2018, which claims the benefit of U.S. Provisional Patent Application Ser. No. 62/598,078, filed on Dec. 13, 2017, with the entire disclosure of each application fully incorporated herein by reference.

FIELD

This disclosure generally relates to wireless communication networks, and more particularly, to a method and apparatus of handling a BWP inactivity timer during a random access procedure in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses of handling a bandwidth part (BWP) inactivity timer during a Random Access procedure in a wireless communication system are disclosed herein. In one method, a user equipment (UE) starts a BWP timer for a serving cell operating in a paired spectrum. The UE initiates a contention-based Random Access (RA) procedure on the serving cell and stops the BWP timer. The UE starts the BWP timer upon successful completion of the RA procedure, wherein the UE considers the contention-based RA procedure successfully completed if a Physical Downlink Control Channel (PDCCH) addressed to a Cell Network Temporary Identifier (C-RNTI) of the UE is received and the PDCCH contains an uplink grant for a new transmission.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: TR 38.913 V14.1.0, "Study on Scenarios and Requirements for Next Generation Access Technologies;" RAN1 #88bis Chairman's note; RAN1 #89 Chairman's note; RAN1 adhoc#2 Chairman's note; RAN1 #90 Chairman's note; RAN1 adhoc#3 Chairman's note; RAN1 #90bis Chairman's note; RAN1 #91 Chairman's note; RAN2 #97bis Chairman's note; RAN2 #98 Chairman's note; RAN2 adhoc#2 Chairman's note; RAN2 #99 Chairman's note; RAN2 #99bis Chairman's note; RAN2 #100 Chairman's note; TS 38.321 V2.0.0, "Medium Access Control (MAC) protocol specification;" and TS 36.321 V14.4.0, "Medium Access Control (MAC) protocol specification." The standards and documents listed above are hereby expressly incorporated by reference in their entirety.

Figure 1:
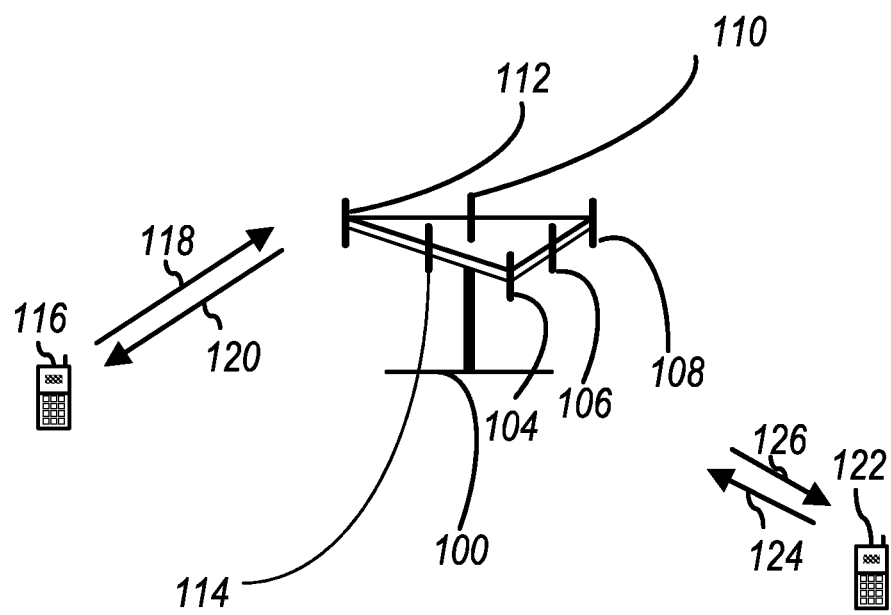
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
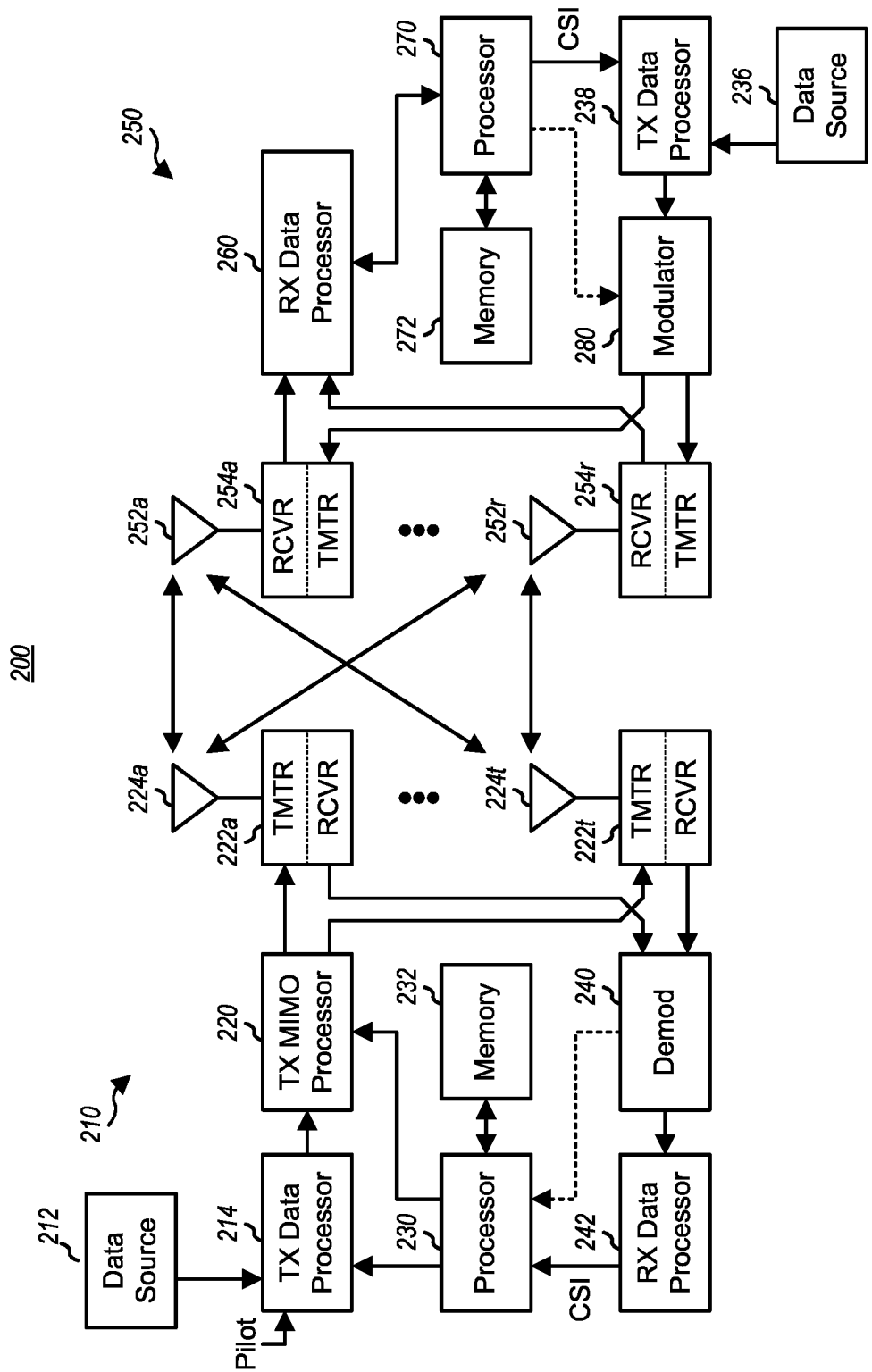
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
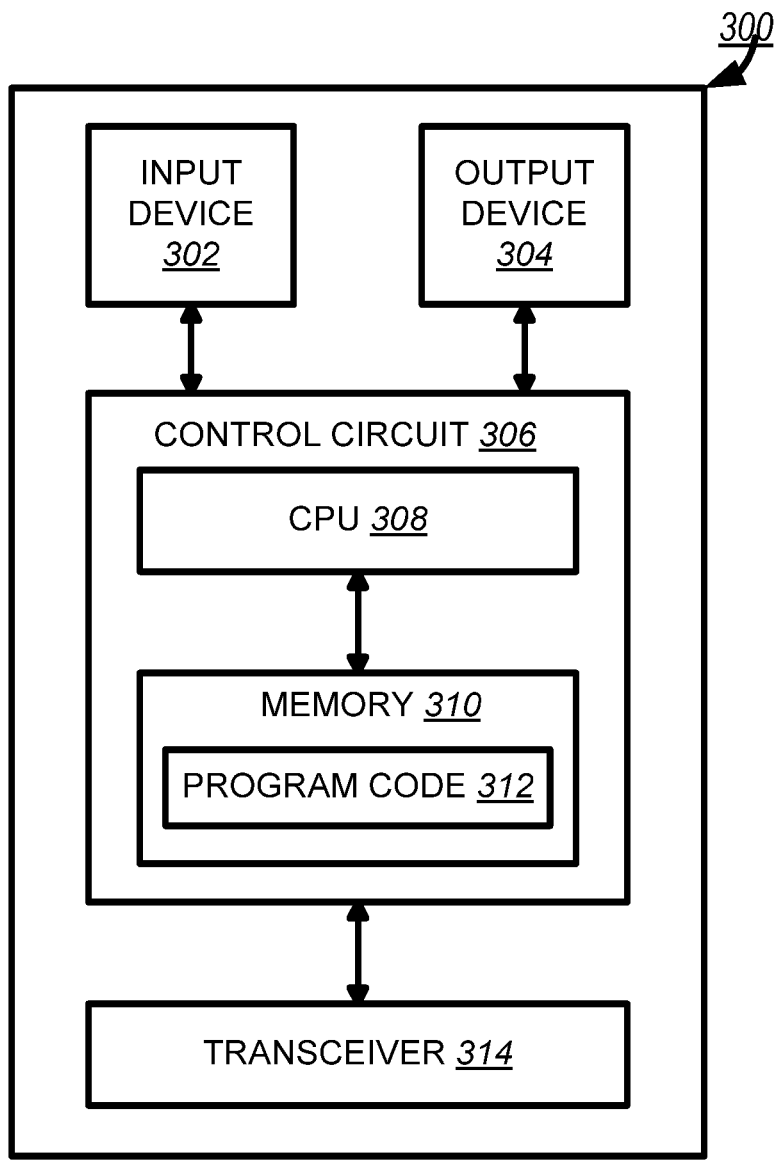
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
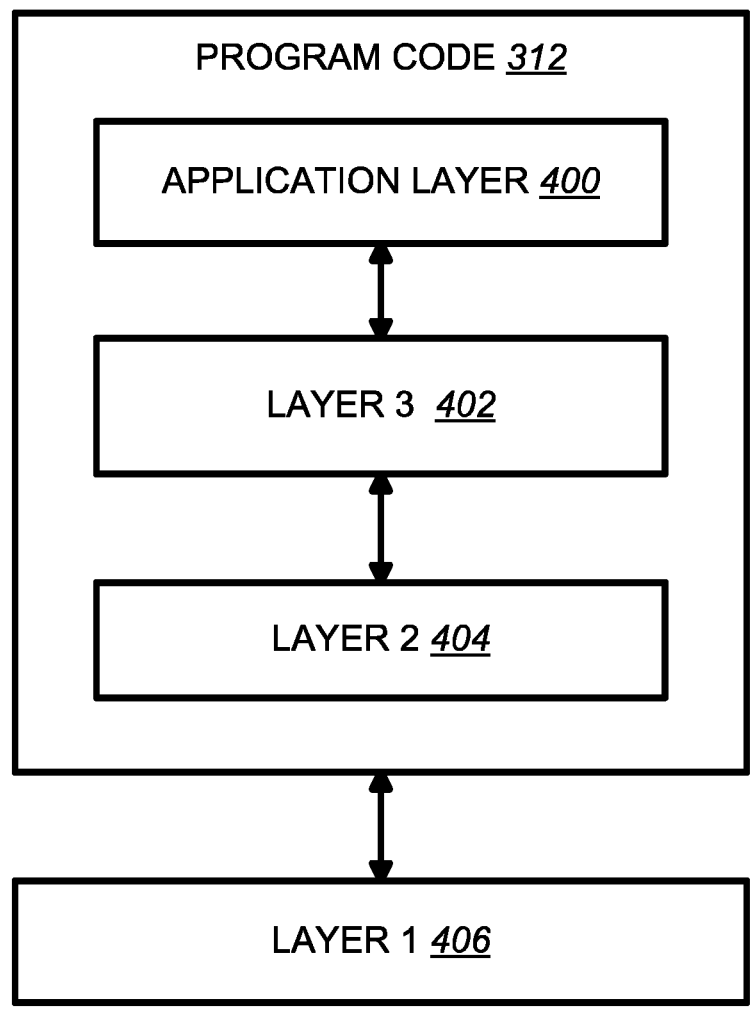
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. The next generation access technology aims to support the following three families of usage scenarios for satisfying both the urgent market needs and the more long-term requirements set forth by the ITU-R IMT-2020:
 eMBB (enhanced Mobile Broadband)
 mMTC (massive Machine Type Communications)
 URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

In New RAT/Radio (NR), the bandwidth part (BWP) is introduced and discussed in RAN1. For example, 3GPP RAN1 #88bis Chairman's note discloses the following work assumptions:
One or multiple bandwidth part configurations for each component carrier can be semi-statically signalled to a UE
 A bandwidth part consists of a group of contiguous PRBs
  Reserved resources can be configured within the bandwidth part
 The bandwidth of a bandwidth part equals to or is smaller than the maximal bandwidth capability supported by a UE
 The bandwidth of a bandwidth part is at least as large as the SS block bandwidth
  The bandwidth part may or may not contain the SS block
 Configuration of a bandwidth part may include the following properties
  Numerology
  Frequency location (e.g. center frequency)
  Bandwidth (e.g. number of PRBs)
  Note that it is for RRC connected mode UE
 FFS how to indicate to the UE which bandwidth part configuration (if multiple) should be assumed for resource allocation at a given time
 FFS neighbour cell RRM 3GPP RAN1 #89 Chairman's note discusses the following agreements:

Agreements

Confirm the WA of RAN1 #88bis.
Each bandwidth part is associated with a specific numerology (sub-carrier spacing, CP type)
 FFS: slot duration indication if RAN1 decides to not to downselect between 7 symbol and 14 symbols for NR slot duration
UE expects at least one DL bandwidth part and one UL bandwidth part being active among the set of configured bandwidth parts for a given time instant.
 A UE is only assumed to receive/transmit within active DL/UL bandwidth part(s) using the associated numerology
  At least PDSCH and/or PDCCH for DL and PUCCH and/or PUSCH for UL
  FFS: down selection of combinations
 FFS if multiple bandwidth parts with same or different numerologies can be active for a UE simultaneously
  It does not imply that it is required for UE to support different numerologies at the same instance.
 FFS: TB to bandwidth part mapping
The active DL/UL bandwidth part is not assumed to span a frequency range larger than the DL/UL bandwidth capability of the UE in a component carrier.
Specify necessary mechanism to enable UE RF retuning for bandwidth part switching Agreements In case of one active DL BWP for a given time instant,
 Configuration of a DL bandwidth part includes at least one CORESET.
 A UE can assume that PDSCH and corresponding PDCCH (PDCCH carrying scheduling assignment for the PDSCH) are transmitted within the same BWP if PDSCH transmission starts no later than K symbols after the end of the PDCCH transmission.
 In case of PDSCH transmission starting more than K symbols after the end of the corresponding PDCCH, PDCCH and PDSCH may be transmitted in different BWPs
  FFS: Value of K (may depend on numerology, possibly reported UE retuning time, etc)
For the indication of active DL/UL bandwidth part(s) to a UE, the following options are considered (including combinations thereof)
 Option #1: DCI (explicitly and/or implicitly)
 Option #2: MAC CE
 Option #3: Time pattern (e.g. DRX like)
Details FFS
3GPP RAN1 adhoc#2 Chairman's note discusses the following agreements:

Agreements

One TB is mapped to one DL/UL carrier.
Re-transmission of a TB cannot take place on different carrier than the initial transmission.
Working Assumption
 Re-transmission of a TB cannot take place on different numerology than the initial transmission in Rel. 15.
When uplink CBG-based (re)transmission is configured, the UL grant indicates which CBG(s) of a TB is/are retransmitted Agreement For FDD, separate sets of bandwidth part (BWP) configurations for DL & UL per component carrier
 The numerology of DL BWP configuration is applied to at least PDCCH, PDSCH & corresponding DMRS
 The numerology of UL BWP configuration is applied to at least PUCCH, PUSCH & corresponding DMRS
For TDD, separate sets of BWP configurations for DL & UL per component carrier
 The numerology of DL BWP configuration is applied to at least PDCCH, PDSCH & corresponding DMRS
 The numerology of UL BWP configuration is applied to at least PUCCH, PUSCH & corresponding DMRS
 For UE, if different active DL and UL BWPs are configured, UE is not expected to retune the center frequency of channel BW between DL and UL Agreements Activation/deactivation of DL and UL bandwidth parts can be
 by means of dedicated RRC signaling
 Possibility to activate in the bandwidth part configuration
 by means of DCI (explicitly and/or implicitly) or MAC CE [one to be selected]

by means of DCI could mean
   Explicit: Indication in DCI (FFS: scheduling assignment/grant or a separate DCI) triggers activation/deactivation
      Separate DCI means DCI not carrying scheduling assignment/grant
   Implicit: Presence of DCI (scheduling assignment/grant) in itself triggers activation/deactivation
   This does not imply that all these alternatives are to be supported.
   FFS: by means of timer
   FFS: according to configured time pattern
   3GPP RAN1 adhoc#2 Chairman's note discusses the following agreements:

Agreements

There is an initial active DL/UL bandwidth part pair to be valid for a UE until the UE is explicitly (re)configured with bandwidth part(s) during or after RRC connection is established
   The initial active DL/UL bandwidth part is confined within the UE minimum bandwidth for the given frequency band
   FFS: details of initial active DL/UL bandwidth part are discussed in initial access agenda
Support activation/deactivation of DL and UL bandwidth part by explicit indication at least in (FFS: scheduling) DCI
   FFS: In addition, MAC CE based approach is supported
Support activation/deactivation of DL bandwidth part by means of timer for a UE to switch its active DL bandwidth part to a default DL bandwidth part
   The default DL bandwidth part can be the initial active DL bandwidth part defined above
   FFS: The default DL bandwidth part can be reconfigured by the network
   FFS: detailed mechanism of timer-based solution (e.g. introducing a new timer or reusing DRX timer)
   FFS: other conditions to switch to default DL bandwidth part
   3GPP RAN1 adhoc#3 Chairman's note discusses the following agreements:

Agreements

In Rel-15, for a UE, there is at most one active DL BWP and at most one active UL BWP at a given time for a serving cell Agreements For each UE-specific serving cell, one or more DL BWPs and one or more UL BWPs can be configured by dedicated RRC for a UE
   FFS association of DL BWP and UL BWP
   FFS definition of an active cell in relation to DL BWP and UL BWP, whether or not there are cross-cell/cross-BWP interactions Agreements NR supports the case that a single scheduling DCI can switch the UE's active BWP from one to another (of the same link direction) within a given serving cell
   FFS whether & how for active BWP switching only without scheduling (including the case of UL scheduling without UL-SCH)

3GPP RAN1 #90bis Chairman's note discusses the following agreements:

Agreements

For paired spectrum, DL and UL BWPs are configured separately and independently in Rel-15 for each UE-specific serving cell for a UE
   For active BWP switching using at least scheduling DCI, DCI for DL is used for DL active BWP switching and DCI for UL is used for UL active BWP switching
      FFS whether or not to support a single DCI switching DL and UL BWP jointly
For unpaired spectrum, a DL BWP and an UL BWP are jointly configured as a pair, with the restriction that the DL and UL BWPs of such a DL/UL BWP pair share the same centre frequency but may be of different bandwidths in Rel-15 for each UE-specific serving cell for a UE
   For active BWP switching using at least scheduling DCI, DCI for either DL or UL can be used for active BWP switching from one DL/UL BWP pair to another pair
      Note: there is no additional restriction on DL BWP and UL BWP pairing
      Note: this applies to at least the case where both DL & UL are activated to a UE in the corresponding unpaired spectrum Agreements:

For a UE, a configured DL (or UL) BWP may overlap in frequency domain with another configured DL (or UL) BWP in a serving cell Agreements For each serving cell, the maximal number of DL/UL BWP configurations is
   For paired spectrum: 4 DL BWPs and 4 UL BWPs
   For unpaired spectrum: 4 DL/UL BWP pairs
   For SUL: 4 UL BWPs Agreements For paired spectrum, support a dedicated timer for timer-based active DL BWP switching to the default DL BWP
   A UE starts the timer when it switches its active DL BWP to a DL BWP other than the default DL BWP
   A UE restarts the timer to the initial value when it successfully decodes a DCI to schedule PDSCH(s) in its active DL BWP
   FFS other cases
   A UE switches its active DL BWP to the default DL BWP when the timer expires
   FFS other conditions (e.g. interaction with DRX timer)
For unpaired spectrum, support a dedicated timer for timer-based active DL/UL BWP pair switching to the default DL/UL BWP pair
   A UE starts the timer when it switches its active DL/UL BWP pair to a DL/UL BWP pair other than the default DL/UL BWP pair
   A UE restarts the timer to the initial value when it successfully decodes a DCI to schedule PDSCH(s) in its active DL/UL BWP pair
   FFS other cases
   A UE switches its active DL/UL BWP pair to the default DL/UL BWP pair when the timer expires FFS other conditions (e.g. interaction with DRX timer)
FFS the range and granularity of the timer

Agreements

For an Scell, RRC signaling for Scell configuration/reconfiguration indicates the first active DL BWP and/or the first active UL BWP when the Scell is activated
  NR supports Scell activation signaling that doesn't contain any information related to the first active DL/UL BWP
For an Scell, active DL BWP and/or UL BWP are deactivated when the Scell is deactivated
  Note: it's RAN1's understanding that Scell can be deactivated by an Scell timer

Agreements

For an Scell, a UE can be configured with the following:
  a timer for timer-based active DL BWP (or DL/UL BWP pair) switching, along with a default DL BWP (or the default DL/UL BWP pair) which is used when the timer is expired
    The default DL BWP can be different from the first active DL BWP
For Pcell, the default DL BWP (or DL/UL BWP pair) can be configured/reconfigured to a UE
  If no default DL BWP is configured, the default DL BWP is the initial active DL BWP

Agreements

In a serving cell where PUCCH is configured, each configured UL BWP includes PUCCH resources

Agreements

In Pcell, for a UE, common search space for at least RACH procedure can be configured in each BWP
FFS whether or not there are any additional UE behavior that needs to be specified
In a serving cell, for a UE, common search space for group-common PDCCH (e.g. SFI, pre-emption indication, etc.) can be configured in each BWP

Agreements

A DL (or UL) BWP is configured to a UE by resource allocation Type 1 with granularity as follows
  Granularity of starting frequency location: 1 PRB
  Granularity of bandwidth size: 1 PRB
  Note: The above granularity doesn't imply that a UE shall adapt its RF channel bandwidth accordingly

Agreements

For a UE, DCI format size itself is not part of RRC configuration irrespective of BWP activation & deactivation in a serving cell
  Note: DCI format size may still depend on different operations and/or configurations (if any) of different information fields in the DCI

Agreements

A UE is RRC signaled an offset between PRB 0 for common PRB indexing and a reference location
  For DL in Pcell, the reference location is the lowest PRB of the cell-defining SSB
  For UL in Pcell of paired spectrum, the reference location is the frequency location of the UL indicated in the RMSI
  For Scell, the reference location is the frequency location indicated in the SCell configuration
  For SUL, the reference location is the frequency location indicated in the SUL configuration
  Note: For UL of unpaired spectrum, the reference location is the same with the DL of the unpaired spectrum.
  Note: the PRB 0 is intended for scrambling initialization, reference point for BWP configuration, etc.
  The range of offset values should be >276*4, with the detailed values FFS

Agreements

The initial active DL BWP is defined as frequency location and bandwidth of RMSI CORESET and numerology of RMSI.
  PDSCH delievering RMSI are confined within the initial active DL BWP
  3GPP RAN1 #91 Chairman's note discusses the following agreements:

Conclusion

No change on DL/UL BWP pairing for unpaired spectrum in RAN1 #90bis and it's up to specification rapporteur's decision on how to simplify the specification text as long as the linking between DL BWP and UL BWP sharing the same center frequency is kept.

Agreements

A UE is expected to perform CSI measurement only within its active DL BWP at the time when the measurement occurs

Agreements

Semi-static configuration of the set of values of K0, the set of values of K1 and the set of values of K2 for a UE can be BWP-specific
  Note: there is no BWP-specific default value(s) defined for K0/K1/K2

Agreements

For timer-based active DL BWP (DL/UL BWP pair) switching,
  Granularity of the timer: 1 ms (subframe) for sub6, 0.5 ms (half-subframe) for mmWave
  Maximal time length of the timer: approximately 50 ms
  It's up to RAN2's decision on a set of exact values for the timer initial setting and whether or not to enable/disable the timer (e.g., via a very large timer value)

Agreements

A UE is RRC signaled with the following for common PRB indexing
  Offset between a reference location and the lowest subcarrier of the reference PRB [point A] (i.e. PRB0 in previous agreements)
  For DL in Pcell, the reference location is the lowest subcarrier of the lowest PRB of the cell-defining SSB after floating SSB is resolved For UL in Pcell of paired spectrum, the reference location is the frequency location of the UL indicated in the RMSI, which is based on ARFCN after floating ARFCN is resolved For Scell, the reference location is the frequency location indicated in the SCell configuration, which is based on ARFCN after floating ARFCN is resolved For SUL, the reference location is the frequency location indicated in the SUL configuration, which is based on ARFCN after floating ARFCN is resolved The reference PRB is expressed based on 15 KHz SCS for FR1 and 60 KHz SCS for FR2

The offset in the unit of PRB is indicated based on 15 KHz SCS for FR1 and 60 KHz SCS for FR2

Common PRB with index 0 for all SCSs contains point A

Offset between point A and the lowest subcarrier of the lowest usable PRB of a given SCS The offset is indicated in the unit of PRB based on the given SCS $k_0$ for each SCS if $k_0$ is kept in Section 5.3 of TS38.211

Channel BW of the carrier configured to the UE

Note: the offsets defined above should cover a frequency range larger than R15 defined maximal bandwidth The lowest subcarrier of the lowest PRB of the cell-defining SSB can be set with the granularity of channel raster after floating SSB is resolved From RAN1, RMSI is assumed to be always PRB-aligned with PRB grid. However, the current 4-bit PRB grid offset in PBCH with 15 kHz SCS can't ensure the above assumption when RMSI has 30 kHz SCS. Therefore, for FR1, RAN1 agrees to increase from 4-bit PRB grid offset to 5-bit PRB grid offset in PBCH where the 5-bit PRB gird offset in PBCH is in unit of subcarrier based on 15 kHz SCS, while for FR2, there is still 4-bit PRB grid offset and RAN1 assumes the 4-bit PRB grid offset in PBCH is in unit of subcarrier based on RMSI numerlogy. Send LS to RAN4—Zhenfei (Huawei) R1-1721578

The LS in R1-1721578 is approved by removing the paragraph (including the figure) after the agreements. Final LS in R1-1721669

For Pcell DL in paired spectrum and Pcell DL & UL in unpaired spectrum, the above information is signaled to a UE is indicated in RMSI For Pcell UL in paired spectrum, the above information is indicated in RMSI and it's also used to determine the frequency location of initial active UL BWP in paired spectrum The range of offset values is 0~(275*8−1), which requires 12 bits Conclusion There is no consensus to introduce BWP with size 0 in Rel-15

There is no consensus to introduce power saving BWP in Rel-15

Agreements

The value range of the transition time(s) of active BWP switching are up to RAN4 and it's also up to RAN4 to decide whether the transition time(s) of active BWP switching is reported to the network as dedicated UE capability or not.

LS to RAN4 to be prepared in R1-1721667 (JJ, Intel), which is approved and final LS in R1-1721712

Agreements

In unpaired spectrum, for timer-based active DL/UL BWP pair switching, a UE restarts the timer to the initial value when the following additional conditions are met It detects a DCI scheduling PUSCH for its current active DL/UL BWP pair It's RAN1's understanding that the remaining issues of timer-based active DL BWP (DL/UL BWP pair) switching (e.g. additional timer restarting/expiration conditions, interaction with RACH procedure and grant-free scheduling) will be discussed in RAN2

Send an LS to RAN2—Peter A. (Qualcomm), R1-1721668, which is approved and final LS in R1-1721714

Conclusion

It's up to RAN2's decision on any remaining issues regarding to BWP operation interaction with C-DRX It's also up to RAN2's decision whether it's necessary to define default UL BWP in paired spectrum Agreements Support HARQ retransmission across DL (UL) BWPs when a UE's active DL (UL) BWP is switched Agreements A UE is not expected to transmit HARQ-ACK if a UE's active UL BWP is switched between the reception of the corresponding DL assignment and the time of HARQ-ACK transmission at least for the paired spectrum In NR, bandwidth part (BWP) is also discussed in RAN2. For example, 3GPP RAN2 #99bis Chairman's note discloses the following agreements:

Agreements for BWP operation in CONNECTED mode:

1: BWP impacts on the CONNECTED mode will be progressed by December 17. Impacts to IDLE mode/INACTIVE mode UEs will be discussed with SA after December 17.

2a: RRC signalling supports to configure 1 or more BWPs (both for DL BWP and UL BWP) for a serving cell (PCell, PSCell).

2b RRC signalling supports to configure 0, 1 or more BWPs (both for DL BWP and UL BWP) for a serving cell SCell (at least 1 DL BWP) (impact of SUL still to be discussed)

3 For a UE, the PCell, PSCell and each SCell has a single associated SSB in frequency (RAN1 terminology is the is the 'cell defining SSB')

4 Cell defining SS block can be changed by synchronous reconfiguration for Cell/PSCell and SCell release/add for the SCell.

5 Each SS block frequency which needs to be measured by the UE should be configured as individual measurement object (i.e. one measurement object corresponds to a single SS block frequency).

6 The cell defining SS block is considered as the time reference of the serving cell, and for RRM serving cell measurements based on SSB (irrespective of which BWP is activated).

=> RRC timers and counters related to RLM are not reset when the active BWP is changed.

Agreements

1. An SR configuration consists of a collection of sets of PUCCH resources across different BWPs and cells with the following constraints:

Per cell, at any given time there is at most one usable PUCCH resource per LCH

This corresponds to the case of one single LTE-like set of SR PUCCH resources being configured per LCH per BWP, and only one BWP being active at a time 4 BWP switching and cell activation/deactivation do not interfere with the operation of the counter and timer.

1. FFS—if MAC is aware of state of the BWP (active or inactivate)

2. FFS—When a BWP is deactivated, the UE stops using all configured downlink assignments and configured uplink grants using resources of this BWP. FFS whether it is suspends the configured grants of the or it clears it.

Agreements

1 RAN2 confirms, a new timer (BWP inactivity timer) is introduced to switch active BWP to default BWP after a certain inactive time. BWP inactivity timer in independent from the DRX timers.

Agreements

1. The power headroom information will still be carried in MAC CE.

2. Virtual and real PHR type 1 and Type 2 are supported

3. At least PHR trigger conditions defined in LTE should be reused in NR

4. Assume BWP does not impact the PHR MAC CE format design

Agreements

Behaviour on the BWP that is deactivated
not transmit on UL-SCH on the BWP;
not monitor the PDCCH on the BWP;
not transmit PUCCH on the BWP;
not transmit on PRACH on the BWP;
do not flush HARQ buffers when doing BWP switching (unless an issue is identified)

2 RAN2 will not support MAC CE BWP switching

3GPP RAN2 #100 Chairman's note discloses the following agreements:

Agreements

1. The UE behavior on the active BWP includes the followings:
   1. PDCCH monitoring on the BWP
   2. PUCCH transmission on the BWP, if configured.
   3. PUSCH transmission on the BWP
   4. PRACH transmission on the BWP, if configured.
   5. PDSCH reception on the BWP 2. For PCell/SCell, no additional activation step is required to activate a BWP when PCell is newly added (i.e. PCell/Scell is always configured with an active BWP)

3. There is no case that a cell is active with no active BWP.

4. BWP switching cannot occur during RA procedure for RRC Connection establishment 5. During CFRA the network doesn't perform BWP switching. FFS on the impact of beam recovery.

6. The UE stops the BWP timer when it initiates random access procedure

7. For contention based, some UL BWP are configured with PRACH resources. The UE performs RACH on the active BWP if configured with RACH resources. If not configured the UE uses initial UL/DL BWP. It is recommended for the network to configure RACH resources on active BWP. If the UE switches to initial BWP it stays there until told by the network to switch with a DCI.

8. When a BWP switch command is received while the UE is doing CBRA, it is up to UE implementation whether it switches BWP, stops the RA and start in new BWP or whether it ignores the BWP switch command and continues the RA in the BWP where it started.

9. There is no additional text required to specify the UE behaviour for the BWP switching during SR procedure. Only the PUCCH resources on the activated BWP can be considered valid.

10. BWP switching either by DCI or BWP timer does not impact any running drx-Inactivity Timer or drx-onDuration-Timer 11. No new PHR trigger condition is required for BWP switching 12. There is one HARQ entity per serving cell even with there are multiple BWPs configured for a serving cell.

13. The BWP timer is specified in the MAC

The NR MAC Running Technical Specification is currently under discussion. Some texts related to BWP operation are quoted from 3GPP TS 38.321 V2.0.0 as follows:

5.15 Bandwidth Part (BWP) Operation

A Serving Cell may be configured with at most four BWPs, and for an activated Serving Cell, there is always one active BWP at any point in time.

The BWP switching for a Serving Cell is used to activate an inactive BWP and deactivate an active BWP at a time, and is controlled by the PDCCH indicating a downlink assignment or an uplink grant. Upon addition of SpCell or activation of an SCell, one BWP is initially active without receiving PDCCH indicating a downlink assignment or an uplink grant. The active BWP for a Serving Cell is indicated by either RRC or PDCCH (as specified in TS 38.213 [6]). For unpaired spectrum, a DL BWP is paired with a UL BWP, and BWP switching is common for both UL and DL.

On the active BWP for each activated Serving Cell configured with a BWP, the MAC entity shall apply normal operations including:

1> transmit on UL-SCH;
1> transmit on RACH;
1> monitor the PDCCH;
1> transmit PUCCH;
1> receive DL-SCH;
1> (re-)initialize any suspended configured uplink grants of configured grant Type 1 according to the stored configuration, if any, and to start in the symbol according to rules in subclause 5.8.2.

On the inactive BWP for each activated Serving Cell configured with a BWP, the MAC entity shall:

1> not transmit on UL-SCH;
1> not transmit on RACH;
1> not monitor the PDCCH;
1> not transmit PUCCH;
1> not receive DL-SCH;
1> clear any configured downlink assignment and configured uplink grant of configured grant Type 2;
1> suspend any configured uplink grant of configured Type 1.

Upon initiation of the Random Access procedure, the MAC entity shall:

1> if PRACH resources are configured for the active UL BWP:
  2> perform the Random Access procedure on the active DL BWP and UL BWP;
1> else (i.e. PRACH resources are not configured for the active UL BWP):
  2> switch to initial DL BWP and UL BWP;
  2> perform the Random Access procedure on the initial DL BWP and UL BWP.

If the MAC entity receives a PDCCH for BWP switching while a Random Access procedure is ongoing in the MAC entity, it is up to UE implementation whether to switch BWP or ignore the PDCCH for BWP switching. If the MAC entity decides to perform BWP switching, the MAC entity shall stop the ongoing Random Access procedure and initiate a Random Access procedure on the new activated BWP. If the MAC decides to ignore the PDCCH for BWP switching, the MAC entity shall continue with the ongoing Random Access procedure on the active BWP.

If BWP-InactivityTimer is configured, the MAC entity shall for each activated Serving Cell:

1> if the Default-DL-BWP is configured, and the active DL BWP is not the BWP indicated by the Default-DL-BWP; or
1> if the Default-DL-BWP is not configured, and the active DL BWP is not the initial BWP:
  2> if a PDCCH indicating downlink assignment is received on the active BWP; or
  2> if a PDCCH for BWP switching is received on the active DL BWP, and the MAC entity switches the active BWP:
    3> start or restart the BWP-InactivityTimer associated with the active DL BWP;
  2> if Random Access procedure is initiated:
    3> stop the BWP-InactivityTimer;
  2> if BWP-InactivityTimer associated with the active DL BWP expires:
    3> if the Default-DL-BWP is configured:
      4> perform BWP switching to a BWP indicated by the Default-DL-BWP;
    3> else:
      4> perform BWP switching to the initial DL BWP.

Some texts related to LTE Random Access (RA) procedure are quoted from 3GPP TS 36.321 V14.4.0 as follows:

5.1 Random Access Procedure

5.1.1 Random Access Procedure Initialization

The Random Access procedure described in this subclause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order [5] masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-MaskIndex, except for NB-IoT where the subcarrier index is indicated; and for Random Access on an SCell, the PDCCH order indicates the ra-PreambleIndex with a value different from 000000 and the ra-PRACH-MaskIndex. For the pTAG preamble transmission on PRACH and reception of a PDCCH order are only supported for SpCell. If the UE is an NB-IoT UE, the Random Access procedure is performed on the anchor carrier or one of the non-anchor carriers for which PRACH resource has been configured in system information.

Before the procedure can be initiated, the following information for related Serving Cell is assumed to be available for UEs other than NB-IoT UEs, BL UEs or UEs in enhanced coverage [8], unless explicitly stated otherwise:

the available set of PRACH resources for the transmission of the Random Access Preamble, prach-ConfigIndex.
  the groups of Random Access Preambles and the set of available Random Access Preambles in each group (SpCell only):

The preambles that are contained in Random Access Preambles group A and Random Access Preambles group B are calculated from the parameters numberOfRA-Preambles and sizeOfRA-PreamblesGroupA:

If sizeOfRA-PreamblesGroupA is equal to numberOfRA-Preambles then there is no Random Access Preambles group B. The preambles in Random Access Preamble group A are the preambles 0 to sizeOfRA-PreamblesGroupA—1 and, if it exists, the preambles in Random Access Preamble group B are the preambles sizeOfRA-PreamblesGroupA to numberOfRA-Preambles—1 from the set of 64 preambles as defined in [7].

if Random Access Preambles group B exists, the thresholds, messagePowerOffsetGroupB and messageSizeGroupA, the configured UE transmitted power of the Serving Cell performing the Random Access Procedure, $P_{CMAX,c}$, [10], and the offset between the preamble and Msg3, deltaPreambleMsg3, that are required for selecting one of the two groups of Random Access Preambles (SpCell only).
  the RA response window size ra-ResponseWindowSize.
  the power-ramping factor powerRampingStep.
  the maximum number of preamble transmission preambleTransMax.
  the initial preamble power preambleInitialReceivedTargetPower.
  the preamble format based offset DELTA_PREAMBLE (see subclause 7.6).
  the maximum number of Msg3 HARQ transmissions maxHARQ-Msg3Tx (SpCell only).
  the Contention Resolution Timer mac-ContentionResolutionTimer (SpCell only).
  NOTE: The above parameters may be updated from upper layers before each Random Access procedure is initiated.

The following information for related Serving Cell is assumed to be available before the procedure can be initiated for NB-IoT UEs, BL UEs or UEs in enhanced coverage [8]:
  if the UE is a BL UE or a UE in enhanced coverage:
    the available set of PRACH resources associated with each enhanced coverage level supported in the Serving Cell for the transmission of the Random Access Preamble, prach-ConfigIndex.
    the groups of Random Access Preambles and the set of available Random Access Preambles in each group (SpCell only):
    If sizeOfRA-PreamblesGroupA is not equal to numberOfRA-Preambles:
      Random Access Preambles group A and B exist and are calculated as above;
    else:
      the preambles that are contained in Random Access Preamble groups for each enhanced coverage level, if it exists, are the preambles firstPreamble to lastPreamble.

NOTE: When a PRACH resource is shared for multiple enhanced coverage levels, and enhanced coverage levels are differentiated by different preamble indices, Group A and Group B is not used for this PRACH resource.

if the UE is an NB-IoT UE:
the available set of PRACH resources supported in the Serving Cell on the anchor carrier, nprach-ParametersList, and on the non-anchor carriers, in ul-ConfigList.
for random access resource selection and preamble transmission:
  a PRACH resource is mapped into an enhanced coverage level.
  each PRACH resource contains a set of nprach-NumSubcarriers subcarriers which can be partitioned into one or two groups for single/multi-tone Msg3 transmission by nprach-SubcarrierMSG3-RangeStart and nprach-NumCBRA-StartSubcarriers as specified in TS 36.211 [7, 10.1.6.1]. Each group is referred to as a Random Access Preamble group below in the procedure text.
  a subcarrier is identified by the subcarrier index in the range: [nprach-SubcarrierOffset, nprach-SubcarrierOffset+nprach-NumSubcarriers−1]
  each subcarrier of a Random Access Preamble group corresponds to a Random Access Preamble.
  when the subcarrier index is explicitly sent from the eNB as part of a PDCCH order ra-PreambleIndex shall be set to the signalled subcarrier index.
the mapping of the PRACH resources into enhanced coverage levels is determined according to the following:
  the number of enhanced coverage levels is equal to one plus the number of RSRP thresholds present in rsrp-ThresholdsPrachInfoList.
  each enhanced coverage level has one anchor carrier PRACH resource present in nprach-ParametersList and zero or one PRACH resource for each non-anchor carrier signalled in ul-ConfigList.
  enhanced coverage levels are numbered from 0 and the mapping of PRACH resources to enhanced coverage levels are done in increasing numRepetitionsPerPreambleAttempt order.
  when multiple carriers provide PRACH resources for the same enhanced coverage level, the UE will randomly select one of them using the following selection probabilities:
  the selection probability of the anchor carrier PRACH resource for the given enhanced coverage level, nprach-ProbabilityAnchor, is given by the corresponding entry in nprach-ProbabilityAnchorList
  the selection probability is equal for all non-anchor carrier PRACH resources and the probability of selecting one PRACH resource on a given non-anchor carrier is (1−nprach-ProbabilityAnchor)/(number of non-anchor NPRACH resources)
the criteria to select PRACH resources based on RSRP measurement per enhanced coverage level supported in the Serving Cell rsrp-ThresholdsPrachInfoList.
the maximum number of preamble transmission attempts per enhanced coverage level supported in the Serving Cell maxNumPreambleAttemptCE.
the number of repetitions required for preamble transmission per attempt for each enhanced coverage level supported in the Serving Cell numRepetitionPerPreambleAttempt.

the configured UE transmitted power of the Serving Cell performing the Random Access Procedure, $P_{CMAX,c}$ [10].
the RA response window size ra-ResponseWindowSize and the Contention Resolution Timer mac-ContentionResolutionTimer (SpCell only) per enhanced coverage level supported in the Serving Cell.
the power-ramping factor powerRampingStep.
the maximum number of preamble transmission preambleTransMax-CE.
the initial preamble power preambleInitialReceivedTargetPower.
the preamble format based offset DELTA_PREAMBLE (see subclause 7.6). For NB-IoT the DELTA_PREAMBLE is set to 0.
for NB-IoT, the use of contention free random access ra-CFRA-Config.
The Random Access procedure shall be performed as follows:
  Flush the Msg3 buffer;
  set the PREAMBLE_TRANSMISSION_COUNTER to 1;
  if the UE is an NB-IoT UE, a BL UE or a UE in enhanced coverage:
    set the PREAMBLE_TRANSMISSION_COUNTER_CE to 1;
  if the starting enhanced coverage level, or for NB-IoT the starting number of NPRACH repetitions, has been indicated in the PDCCH order which initiated the Random Access procedure, or if the starting enhanced coverage level has been provided by upper layers:
    the MAC entity considers itself to be in that enhanced coverage level regardless of the measured RSRP;
  else:
    if the RSRP threshold of enhanced coverage level 3 is configured by upper layers in rsrp-ThresholdsPrachInfoList and the measured RSRP is less than the RSRP threshold of enhanced coverage level 3 and the UE is capable of enhanced coverage level 3 then:
      the MAC entity considers to be in enhanced coverage level 3;
    else if the RSRP threshold of enhanced coverage level 2 configured by upper layers in rsrp-ThresholdsPrachInfoList and the measured RSRP is less than the RSRP threshold of enhanced coverage level 2 and the UE is capable of enhanced coverage level 2 then:
      the MAC entity considers to be in enhanced coverage level 2;
    else if the measured RSRP is less than the RSRP threshold of enhanced coverage level 1 as configured by upper layers in rsrp-ThresholdsPrachInfoList then:
      the MAC entity considers to be in enhanced coverage level 1;
    else:
      the MAC entity considers to be in enhanced coverage level 0;
  set the backoff parameter value to 0 ms;
  for the RN, suspend any RN subframe configuration;
  proceed to the selection of the Random Access Resource (see subclause 5.1.2).
    NOTE: There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

NOTE: An NB-IoT UE measures RSRP on the anchor carrier.

5.1.2 Random Access Resource Selection

The Random Access Resource selection procedure shall be performed as follows:

For BL UEs or UEs in enhanced coverage, select the PRACH resource set corresponding to the selected enhanced coverage level.

If, except for NB-IoT, ra-PreambleIndex (Random Access Preamble) and ra-PRACH-MaskIndex (PRACH Mask Index) have been explicitly signalled and ra-PreambleIndex is not 000000:
  the Random Access Preamble and the PRACH Mask Index are those explicitly signalled;
else, for NB-IoT, if ra-PreambleIndex (Random Access Preamble) and PRACH resource have been explicitly signalled:
  the PRACH resource is that explicitly signalled;
  if the ra-PreambleIndex signalled is not 000000:
    if ra-CFRA-Config is configured:
      the Random Access Preamble is set to nprach-SubcarrierOffset+nprach-NumCBRA-StartSubcarriers+(ra-PreambleIndex modulo (nprach-NumSubcarriers−nprach-NumCBRA-StartSubcarriers)), where nprach-SubcarrierOffset, nprach-NumCBRA-StartSubcarriers and nprach-NumSubcarriers are parameters in the currently used PRACH resource.
    else:
      the Random Access Preamble is set to nprach-SubcarrierOffset+(ra-PreambleIndex modulo nprach-NumSubcarriers), where nprach-SubcarrierOffset and nprach-NumSubcarriers are parameters in the currently used PRACH resource.
  else:
    select the Random Access Preamble group according to the PRACH resource and the support for multi-tone Msg3 transmission. A UE supporting multi-tone Msg3 shall only select the single-tone Msg3 Random Access Preambles group if there is no multi-tone Msg3 Random Access Preambles group.
    randomly select a Random Access Preamble within the selected group.
else the Random Access Preamble shall be selected by the MAC entity as follows:
  For BL UEs or UEs in enhanced coverage, if Random Access Preamble group B does not exist, select the Random Access Preambles group corresponding to the selected enhanced coverage level.
  For NB-IoT, randomly select one of the PRACH resources corresponding to the selected enhanced coverage level according to the configured probability distribution, and select the Random Access Preambles group corresponding to the PRACH resource and the support for multi-tone Msg3 transmission. A UE supporting multi-tone Msg3 shall only select the single-tone Msg3 Random Access Preambles group if there is no multi-tone Msg3 Random Access Preambles group.
  Except for BL UEs or UEs in enhanced coverage in case preamble group B does not exist, or except for NB-IoT UEs, if Msg3 has not yet been transmitted, the MAC entity shall:
    if Random Access Preambles group B exists and any of the following events occur:
      the potential message size (UL data available for transmission plus MAC header and, where required, MAC control elements) is greater than messageSizeGroupA and the pathloss is less than $P_{CMAX,c}$ (of the Serving Cell performing the Random Access Procedure)−preambleInitialReceivedTargetPower−deltaPreambleMsg3−messagePowerOffsetGroupB;
      the Random Access procedure was initiated for the CCCH logical channel and the CCCH SDU size plus MAC header is greater than messageSizeGroupA;
      select the Random Access Preambles group B;
    else:
      select the Random Access Preambles group A.
  else, if Msg3 is being retransmitted, the MAC entity shall:
    select the same group of Random Access Preambles as was used for the preamble transmission attempt corresponding to the first transmission of Msg3.
  randomly select a Random Access Preamble within the selected group. The random function shall be such that each of the allowed selections can be chosen with equal probability;
  except for NB-IoT, set PRACH Mask Index to 0.
  determine the next available subframe containing PRACH permitted by the restrictions given by the prach-ConfigIndex (except for NB-IoT), the PRACH Mask Index (except for NB-IoT, see subclause 7.3), physical layer timing requirements [2] and in case of NB-IoT, the subframes occupied by PRACH resources related to a higher enhanced coverage level (a MAC entity may take into account the possible occurrence of measurement gaps when determining the next available PRACH subframe);
  if the transmission mode is TDD and the PRACH Mask Index is equal to zero:
    if ra-PreambleIndex was explicitly signalled and it was not 000000 (i.e., not selected by MAC):
      randomly select, with equal probability, one PRACH from the PRACHs available in the determined subframe.
    else:
      randomly select, with equal probability, one PRACH from the PRACHs available in the determined subframe and the next two consecutive subframes.
  else:
    determine a PRACH within the determined subframe in accordance with the requirements of the PRACH Mask Index, if any.
  for NB-IoT UEs, BL UEs or UEs in enhanced coverage, select the ra-ResponseWindowSize and mac-ContentionResolutionTimer corresponding to the selected enhanced coverage level and PRACH.
  proceed to the transmission of the Random Access Preamble (see subclause 5.1.3).

5.1.3 Random Access Preamble Transmission

The random-access procedure shall be performed as follows:
set PREAMBLE_RECEIVED_TARGET_POWER to preambleInitialReceivedTargetPower+DELTA_PREAMBLE+(PREAMBLE_TRANSMISSION_COUNTER-1)*powerRampingStep;
  if the UE is a BL UE or a UE in enhanced coverage:
  the PREAMBLE_RECEIVED_TARGET_POWER is set to: PREAMBLE_RECEIVED_TARGET_POWER-10*log10(numRepetitionPerPreambleAttempt);
  if NB-IoT:
  for enhanced coverage level 0, the PREAMBLE_RECEIVED_TARGET_POWER is set to: PREAMBLE_RECEIVED_TARGET_POWER-10*log10(numRepetitionPerPreambleAttempt)
  for other enhanced coverage levels, the PREAMBLE_RECEIVED_TARGET_POWER is set corresponding to the max UE output power;
  if the UE is an NB-IoT UE, a BL UE or a UE in enhanced coverage:
    instruct the physical layer to transmit a preamble with the number of repetitions required for preamble transmission corresponding to the selected preamble group (i.e., numRepetnionPerPreambleAnempt) using the selected PRACH corresponding to the selected enhanced coverage level, corresponding RA-RNTI, preamble index or for NB-IoT subcarrier index, and PREAMBLE_RECEIVED_TARGET_POWER.
  else:
    instruct the physical layer to transmit a preamble using the selected PRACH, corresponding RA-RNTI, preamble index and PREAMBLE_RECEIVED_TARGET_POWER.

5.1.4 Random Access Response Reception

Once the Random Access Preamble is transmitted and regardless of the possible occurrence of a measurement gap or a Sidelink Discovery Gap for Transmission or a Sidelink Discovery Gap for Reception, the MAC entity shall monitor the PDCCH of the SpCell for Random Access Response(s) identified by the RA-RNTI defined below, in the RA Response window which starts at the subframe that contains the end of the preamble transmission [7] plus three subframes and has length ra-ResponseWindowSize. If the UE is a BL UE or a UE in enhanced coverage, RA Response window starts at the subframe that contains the end of the last preamble repetition plus three subframes and has length ra-ResponseWindowSize for the corresponding enhanced coverage level. If the UE is an NB-IoT UE, in case the number of NPRACH repetitions is greater than or equal to 64, RA Response window starts at the subframe that contains the end of the last preamble repetition plus 41 subframes and has length ra-ResponseWindowSize for the corresponding enhanced coverage level, and in case the number of NPRACH repetitions is less than 64, RA Response window starts at the subframe that contains the end of the last preamble repetition plus 4 subframes and has length ra-ResponseWindowSize for the corresponding enhanced coverage level. The RA-RNTI associated with the PRACH in which the Random Access Preamble is transmitted, is computed as:

$$\text{RA-RNTI}=1+t\_id+10*f\_id$$

where t_id is the index of the first subframe of the specified PRACH (0≤t_id<10), and f_id is the index of the specified PRACH within that subframe, in ascending order of frequency domain (0≤f_id<6) except for NB-IoT UEs, BL UEs or UEs in enhanced coverage. If the PRACH resource is on a TDD carrier, the f_id is set to $f_{RA}$, where $f_{RA}$ is defined in Section 5.7.1 of [7].
For BL UEs and UEs in enhanced coverage, RA-RNTI associated with the PRACH in which the Random Access Preamble is transmitted, is computed as:

$$\text{RA-RNTI}=1+t\_id+10*f\_id+60*(SFN\_id \bmod (Wmax/10))$$

where t_id is the index of the first subframe of the specified PRACH (0≤t_id <10), fid is the index of the specified PRACH within that subframe, in ascending order of frequency domain (0≤f_id<6), SFN_id is the index of the first radio frame of the specified PRACH, and Wmax is 400, maximum possible RAR window size in subframes for BL UEs or UEs in enhanced coverage. If the PRACH resource is on a TDD carrier, the f_id is set to $f_{RA}$, where $f_{RA}$ is defined in Section 5.7.1 of [7].
For NB-IoT UEs, the RA-RNTI associated with the PRACH in which the Random Access Preamble is transmitted, is computed as:

$$\text{RA-RNTI}=1+\text{floor}(SFN\_id/4)+256*carrier\_id$$

where SFN_id is the index of the first radio frame of the specified PRACH and carrier_id is the index of the UL carrier associated with the specified PRACH. The carrier_id of the anchor carrier is 0.
The MAC entity may stop monitoring for Random Access Response(s) after successful reception of a Random Access Response containing Random Access Preamble identifiers that matches the transmitted Random Access Preamble.
  If a downlink assignment for this TTI has been received on the PDCCH for the RA-RNTI and the received TB is successfully decoded, the MAC entity shall regardless of the possible occurrence of a measurement gap or a Sidelink Discovery Gap for Transmission or a Sidelink Discovery Gap for Reception:
  if the Random Access Response contains a Backoff Indicator subheader:
    set the backoff parameter value as indicated by the BI field of the Backoff Indicator subheader and Table 7.2-1, except for NB-IoT where the value from Table 7.2-2 is used.
  else, set the backoff parameter value to 0 ms.
  if the Random Access Response contains a Random Access Preamble identifier corresponding to the transmitted Random Access Preamble (see subclause 5.1.3), the MAC entity shall:
    consider this Random Access Response reception successful and apply the following actions for
  the serving cell where the Random Access Preamble was transmitted:
    process the received Timing Advance Command (see subclause 5.2);
    indicate the preambleInitialReceivedTargetPower and the amount of power ramping applied to the latest preamble transmission to lower layers (i.e., (PREAMBLE_TRANSMISSION_COUNTER-1)*powerRampingStep);
    if the SCell is configured with ul-Configuration-r14, ignore the received UL grant otherwise process the received UL grant value and indicate it to the lower layers;
    if, except for NB-IoT, ra-PreambleIndex was explicitly signalled and it was not 000000 (i.e., not selected by MAC):

consider the Random Access procedure successfully completed.
else if, the UE is an NB-IoT UE, ra-PreambleIndex was explicitly signalled and it was not 000000 (i.e., not selected by MAC) and ra-CFRA-Config is configured:
consider the Random Access procedure successfully completed.
the UL grant provided in the Random Access Response message is valid only for the configured carrier.
else:
if the Random Access Preamble was selected by the MAC entity; or
if the UE is an NB-IoT UE, the ra-PreambleIndex was explicitly signalled and it was not 000000 and ra-CFRA-Config is not configured:
set the Temporary C-RNTI to the value received in the Random Access Response message no later than at the time of the first transmission corresponding to the UL grant provided in the Random Access Response message;
if this is the first successfully received Random Access Response within this Random Access procedure:
if the transmission is not being made for the CCCH logical channel, indicate to the Multiplexing and assembly entity to include a C-RNTI MAC control element in the subsequent uplink transmission;
obtain the MAC PDU to transmit from the "Multiplexing and assembly" entity and store it in the Msg3 buffer.
NOTE: When an uplink transmission is required, e.g., for contention resolution, the eNB should not provide a grant smaller than 56 bits (or 88 bits for NB-IoT) in the Random Access Response.
NOTE: If within a Random Access procedure, an uplink grant provided in the Random Access Response for the same group of Random Access Preambles has a different size than the first uplink grant allocated during that Random Access procedure, the UE behavior is not defined.
If no Random Access Response or, for NB-IoT UEs, BL UEs or UEs in enhanced coverage for mode B operation, no PDCCH scheduling Random Access Response is received within the RA Response window, or if none of all received Random Access Responses contains a Random Access Preamble identifier corresponding to the transmitted Random Access Preamble, the Random Access Response reception is considered not successful and the MAC entity shall:
if the notification of power ramping suspension has not been received from lower layers:
increment PREAMBLE_TRANSMISSION_COUNTER by 1;
if the UE is an NB-IoT UE, a BL UE or a UE in enhanced coverage:
if PREAMBLE_TRANSMISSION_COUNTER= preambleTransMax-CE+1:
if the Random Access Preamble is transmitted on the SpCell:
indicate a Random Access problem to upper layers;
if NB-IoT:
consider the Random Access procedure unsuccessfully completed;
else:
if PREAMBLE_TRANSMISSION_COUNTER= preambleTransMax+1:
if the Random Access Preamble is transmitted on the SpCell:
indicate a Random Access problem to upper layers;
if the Random Access Preamble is transmitted on an SCell:
consider the Random Access procedure unsuccessfully completed.
if in this Random Access procedure, the Random Access Preamble was selected by MAC:
based on the backoff parameter, select a random backoff time according to a uniform distribution between 0 and the Backoff Parameter Value;
delay the subsequent Random Access transmission by the backoff time;
else if the SCell where the Random Access Preamble was transmitted is configured with ul-Configuration-r14:
delay the subsequent Random Access transmission until the Random Access Procedure is initiated by a PDCCH order with the same ra-PreambleIndex and ra-PRACH-MaskIndex;
if the UE is an NB-IoT UE, a BL UE or a UE in enhanced coverage:
increment PREAMBLE_TRANSMISSION_COUNTER_CE by 1;
if PREAMBLE_TRANSMISSION_COUNTER_CE= maxNumPreambleAttemptCE for the corresponding enhanced coverage level+1:
reset PREAMBLE_TRANSMISSION_COUNTER_CE;
consider to be in the next enhanced coverage level, if it is supported by the Serving Cell and the UE, otherwise stay in the current enhanced coverage level;
if the UE is an NB-IoT UE:
if the Random Access Procedure was initiated by a PDCCH order:
select the PRACH resource in the list of UL carriers providing a PRACH resource for the selected enhanced coverage level for which the carrier index is equal to ((Carrier Index from the PDCCH order) modulo (Number of PRACH resources in the selected enhanced coverage));
consider the selected PRACH resource as explicitly signalled;
proceed to the selection of a Random Access Resource (see subclause 5.1.2).

5.1.5 Contention Resolution

Contention Resolution is based on either C-RNTI on PDCCH of the SpCell or UE Contention Resolution Identity on DL-SCH.
Once Msg3 is transmitted, the MAC entity shall:
except for a BL UE or a UE in enhanced coverage, or an NB-IoT UE, start mac-ContentionResolutionTimer and restart mac-ContentionResolutionTimer at each HARQ retransmission;
for a BL UE or a UE in enhanced coverage, or an NB-IoT UE, start mac-ContentionResolutionTimer and restart mac-ContentionResolutionTimer at each HARQ retransmission of the bundle in the subframe containing the last repetition of the corresponding PUSCH transmission;

regardless of the possible occurrence of a measurement gap or Sidelink Discovery Gap for Reception, monitor the PDCCH until mac-ContentionResolutionTimer expires or is stopped;
    if notification of a reception of a PDCCH transmission is received from lower layers, the MAC entity shall:
        if the C-RNTI MAC control element was included in Msg3:
            if the Random Access procedure was initiated by the MAC sublayer itself or by the RRC sublayer and the PDCCH transmission is addressed to the C-RNTI and contains an UL grant for a new transmission; or
            if the Random Access procedure was initiated by a PDCCH order and the PDCCH transmission is addressed to the C-RNTI:
        consider this Contention Resolution successful;
        stop mac-ContentionResolutionTimer;
        discard the Temporary C-RNTI;
        if the UE is an NB-IoT UE:
            the UL grant or DL assignment contained in the PDCCH transmission is valid only for the configured carrier.
        consider this Random Access procedure successfully completed.
        else if the CCCH SDU was included in Msg3 and the PDCCH transmission is addressed to its Temporary C-RNTI:
            if the MAC PDU is successfully decoded:
            stop mac-ContentionResolutionTimer;
            if the MAC PDU contains a UE Contention Resolution Identity MAC control element; and
            if the UE Contention Resolution Identity included in the MAC control element matches the 48 first bits of the CCCH SDU transmitted in Msg3:
                consider this Contention Resolution successful and finish the disassembly and demultiplexing of the MAC PDU;
                set the C-RNTI to the value of the Temporary C-RNTI;
                discard the Temporary C-RNTI;
                consider this Random Access procedure successfully completed.
            else
                discard the Temporary C-RNTI;
                consider this Contention Resolution not successful and discard the successfully decoded MAC PDU.
    if mac-ContentionResolutionTimer expires:
        discard the Temporary C-RNTI;
        consider the Contention Resolution not successful.
    if the Contention Resolution is considered not successful the MAC entity shall:
        flush the HARQ buffer used for transmission of the MAC PDU in the Msg3 buffer;
        if the notification of power ramping suspension has not been received from lower layers:
            increment PREAMBLE_TRANSMISSION_COUNTER by 1;
        if the UE is an NB-IoT UE, a BL UE or a UE in enhanced coverage:
            if PREAMBLE_TRANSMISSION_COUNTER= preambleTransMax-CE+1:
            indicate a Random Access problem to upper layers.
        if NB-IoT:
            consider the Random Access procedure unsuccessfully completed;
    else:
        if PREAMBLE_TRANSMISSION_COUNTER= preambleTransMax+1:
        indicate a Random Access problem to upper layers.
    based on the backoff parameter, select a random backoff time according to a uniform distribution between 0 and the Backoff Parameter Value;
    delay the subsequent Random Access transmission by the backoff time;
    proceed to the selection of a Random Access Resource (see subclause 5.1.2).

5.1.6 Completion of the Random Access Procedure

At completion of the Random Access procedure, the MAC entity shall:
    discard explicitly signalled ra-PreambleIndex and ra-PRACH-MaskIndex, if any;
    flush the HARQ buffer used for transmission of the MAC PDU in the Msg3 buffer.
In addition, the RN shall resume the suspended RN subframe configuration, if any.

The NR MAC Running Technical Specification is currently under discussion. Some texts related to RA procedure are quoted from 3GPP TS 38.321 V2.0.0 as follows:

5.1 Random Access Procedure 5.1.1 Random Access Procedure Initialization

The Random Access procedure described in this subclause is initiated by a PDCCH order, by the MAC entity itself, by beam failure indication from lower layer, or by RRC for the events in accordance with TS 38.300 [2]. There is only one Random Access procedure ongoing at any point in time in a MAC entity. The Random Access procedure on an SCell other than PSCell shall only be initiated by a PDCCH order with ra-PreambleIndex different from 0b000000.

NOTE: If the MAC entity receives a request for a new Random Access procedure while another is already ongoing in the MAC entity, it is up to UE implementation whether to continue with the ongoing procedure or start with the new procedure (e.g. for SI request).
RRC configures the following parameters for the Random Access procedure:
    prach-ConfigIndex: the available set of PRACH resources for the transmission of the Random Access Preamble;
    ra-PreambleInitialReceivedTargetPower: initial preamble power;
    rsrp-ThresholdSSB, csirs-dedicatedRACH-Threshold, and sul-RSRP-Threshold: an RSRP threshold for the selection of the SS block and corresponding PRACH resource;
    ra-PreamblePowerRampingStep: the power-ramping factor;
    ra-PreambleIndex: Random Access Preamble;
    ra-PreambleTx-Max: the maximum number of preamble transmission;
    if SSBs are mapped to preambles:
        startIndexRA-PreambleGroupA, numberOfRA-Preambles, and numberOfRA-PreamblesGroupA for each SSB in each group (SpCell only);
    else:
        startIndexRA-PreambleGroupA, numberOfRA-Preambles, and numberOfRA-PreamblesGroupA in each group (SpCell only);

If numberOfRA-PreamblesGroupA is equal to numberOfRA-Preambles, there is no Random Access Preambles group B.

The preambles in Random Access Preamble group A are the preambles startIndexRA-PreambleGroupA to startIndexRA-PreambleGroupA+numberOfRA-PreamblesGroupA−1.

The preambles in Random Access Preamble group B, if exists, are the preambles startIndexRA-PreambleGroupA+numberOfRA-PreamblesGroupA to startIndexRA-PreambleGroupA+numberOfRA-Preambles−1;

NOTE: if randomAccess Preambles group B is supported by the cell and SSBs are mapped to preambles, random access preambles group B is included in each SSB.

if Random Access Preambles group B exists:
ra-Msg3SizeGroupA (per cell): the threshold to determine the groups of Random Access Preambles;
the set of Random Access Preambles for SI request and corresponding PRACH resource(s), if any;
the set of Random Access Preambles for beam failure recovery request and corresponding PRACH resource(s), if any;
ra-Response Window: the time window to monitor RA response(s);
bfr-ResponseWindow: the time window to monitor response(s) on beam failure recovery request;
ra-ContentionResolutionTimer: the Contention Resolution Timer (SpCell only).

In addition, the following information for related Serving Cell is assumed to be available for UEs:
if Random Access Preambles group B exists:
if the MAC Entity is configured with supplementary Uplink, and SUL carrier is selected for performing Random Access Procedure:
$P_{CMAX,c\_SUL}$: the configured UE transmitted power of the SUL carrier;
else:
$P_{CMAX,c}$: the configured UE transmitted power of the Serving Cell performing the Random Access Procedure.

The following UE variables are used for the Random Access procedure:
PREAMBLE_INDEX;
PREAMBLE_TRANSMISSION_COUNTER;
PREAMBLE_POWER_RAMPING_COUNTER;
PREAMBLE_RECEIVED_TARGET_POWER;
PREAMBLE_BACKOFF;
PCMAX;
TEMPORARY_C-RNTI.

When the Random Access procedure is initiated, the MAC entity shall:
1> flush the Msg3 buffer;
1> set the PREAMBLE_TRANSMISSION_COUNTER to 1;
1> set the PREAMBLE_POWER_RAMPING_COUNTER to 1;
1> set the PREAMBLE_BACKOFF to 0 ms;
1> if the carrier to use for the Random Access procedure is explicitly signalled:
2> select the signalled carrier for performing Random Access procedure;
1> else if the carrier to use for the Random Access procedure is not explicitly signalled; and
1> if the cell for the Random Access procedure is configured with supplementaryUplink; and
1> if the RSRP of the downlink pathloss reference is less than sul-RSRP-Threshold:
2> select the SUL carrier for performing Random Access procedure;
2> set the PCMAX to $P_{CMAX,c\_SUL}$;
1> else:
2> select the normal carrier for performing Random Access procedure;
2> set the PCMAX to $P_{MAX,c}$;
1> perform the Random Access Resource selection procedure (see subclause 5.1.2).

5.1.2 Random Access Resource Selection

The MAC entity shall:
1> if the Random Access procedure was initiated by a beam failure indication from lower layer; and
1> if the contention free PRACH resources for beam failure recovery request associated with any of the SS blocks and/or CSI-RSs have been explicitly provided by RRC; and
1> if at least one of the SS blocks with SS-RSRP above rsrp-ThresholdSSB amongst the associated SS blocks or the CSI-RSs with CSI-RSRP above csirs-dedicatedRACH-Threshold amongst the associated CSI-RSs is available:
2> select an SS block with SS-RSRP above rsrp-ThresholdSSB amongst the associated SS blocks or a CSI-RS with CSI-RSRP above csirs-dedicatedRACH-Threshold amongst the associated CSI-RSs;
2> set the PREAMBLE_INDEX to a ra-PreambleIndex corresponding to the selected SS block or CSI-RS from the set of Random Access Preambles for beam failure recovery request;
1> else if the ra-PreambleIndex has been explicitly provided by either PDCCH or RRC; and
1> if the ra-PreambleIndex is not 0b000000; and
1> if contention free PRACH resource associated with SS blocks or CSI-RS have not been explicitly provided by RRC:
2> set the PREAMBLE_INDEX to the signalled ra-PreambleIndex;
1> else if the contention free PRACH resources associated with SS blocks have been explicitly provided by RRC and at least one SS block with SS-RSRP above rsrp-ThresholdSSB amongst the associated SS blocks is available:
2> select an SS block with SS-RSRP above rsrp-ThresholdSSB amongst the associated SS blocks;
2> set the PREAMBLE_INDEX to a ra-PreambleIndex corresponding to the selected SS block;
1> else if the contention free PRACH resources associated with CSI-RSs have been explicitly provided by RRC and at least one CSI-RS with CSI-RSRP above csirs-dedicatedRACH-Threshold amongst the associated CSI-RSs is available:
2> select a CSI-RS with CSI-RSRP above csirs-dedicatedRACH-Threshold amongst the associated CSI-RSs;
2> set the PREAMBLE_INDEX to a ra-PreambleIndex corresponding to the selected CSI-RS;
1> else:
2> select a SS block with SS-RSRP above rsrp-ThresholdSSB;
2> if Msg3 has not yet been transmitted:
3> if Random Access Preambles group B exists; and
3> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)–ra-PreambleInitialReceivedTargetPower:
 4> select the Random Access Preambles group B;
 3> else:
  4> select the Random Access Preambles group A.
 2> else (i.e. Msg3 is being retransmitted):
  3> select the same group of Random Access Preambles as was used for the preamble transmission attempt corresponding to the first transmission of Msg3.
 2> if the association between Random Access Preambles and SS blocks is configured:
  3> select a ra-PreambleIndex randomly with equal probability from the random access preambles associated with the selected SS block and the selected group;
 2> else:
  3> select a ra-PreambleIndex randomly with equal probability from the random access preambles within the selected group;
 2> set the PREAMBLE_INDEX to the selected ra-PreambleIndex;
1> if an SS block is selected above and an association between PRACH occasions and SS blocks is configured:
 2> determine the next available PRACH occasion from the PRACH occasions corresponding to the selected SS block;
1> else if a CSI-RS is selected above and an association between PRACH occasions and CSI-RSs is configured:
 2> determine the next available PRACH occasion from the PRACH occasions corresponding to the selected CSI-RS;
1> else:
 2> determine the next available PRACH occasion;
1> perform the Random Access Preamble transmission procedure (see subclause 5.1.3).

5.1.3 Random Access Preamble Transmission

The MAC entity shall, for each preamble:
1> if PREAMBLE_TRANSMISSION_COUNTER is greater than one; and
1> if the notification of suspending power ramping counter has not been received from lower layers; and
1> if SS block selected is not changed (i.e. same as the previous random access preamble transmission):
 2> increment PREAMBLE_POWER_RAMPING_COUNTER by 1;
1> set PREAMBLE_RECEIVED_TARGET_POWER to ra-PreambleInitialReceivedTargetPower+DELTA_PREAMBLE+(PREAMBLE_POWER_RAMPING_COUNTER−1)*powerRampingStep;
1> except for contention free preamble for beam failure recovery request, compute the RA-RNTI associated with the PRACH in which the Random Access Preamble is transmitted;
1> instruct the physical layer to transmit the preamble using the selected PRACH, corresponding RA-RNTI (if available), PREAMBLE_INDEX and PREAMBLE_RECEIVED_TARGET_POWER.
The RA-RNTI associated with the PRACH in which the Random Access Preamble is transmitted, is computed as:

$$\text{RA-RNTI} = 1 + s\_id + 14 * t\_id + 14 * X * f\_id + 14 * X * Y * ul\_carrier\_id$$

where s_id is the index of the first OFDM symbol of the specified PRACH (0≤s_id<14), t_id is the index of the first slot of the specified PRACH in a system frame (0≤t_id<X), fid is the index of the specified PRACH in the frequency domain (0≤fid<Y), and ul_carrier_id is the UL carrier used for Msg1 transmission (0 for normal carrier, and 1 for SUL carrier). The values X and Y are specified in TS 38.213 [6].

5.1.4 Random Access Response Reception

Once the Random Access Preamble is transmitted and regardless of the possible occurrence of a measurement gap, the MAC entity shall:
1> if 'multiple preamble transmission' has been signalled:
 2> start the ra-Response Window at the start of the first PDCCH occasion after a fixed duration of X symbols (specified in TS 38.213 [6]) from the end of the first preamble transmission;
 2> monitor the PDCCH of the SpCell for Random Access Response(s) identified by the RA-RNTI(s) while ra-Response Window is running;
1> else if the contention free Random Access Preamble for beam failure recovery request was transmitted by the MAC entity:
 2> start the bfr-Response Window at the start of the first PDCCH occasion after a fixed duration of X symbols (specified in TS 38.213 [6]) from the end of the preamble transmission;
 2> monitor the PDCCH of the SpCell for response to beam failure recovery request identified by the C-RNTI while bfr-Response Window is running;
1> else:
 2> start the ra-Response Window at the start of the first PDCCH occasion after a fixed duration of X symbols (specified in TS 38.213 [6]) from the end of the preamble transmission;
 2> monitor the PDCCH of the SpCell for Random Access Response(s) identified by the RA-RNTI while the ra-Response Window is running;
1> if PDCCH transmission is addressed to the C-RNTI; and
1> if the contention free Random Access Preamble for beam failure recovery request was transmitted by the MAC entity:
 2> consider the Random Access procedure successfully completed.
1> else if a downlink assignment has been received on the PDCCH for the RA-RNTI and the received TB is successfully decoded:
 2> if the Random Access Response contains a Backoff Indicator subheader:
  3> set the PREAMBLE_BACKOFF to value of the BI field of the Backoff Indicator subheader using Table 7.2-1.
 2> else:
  3> set the PREAMBLE_BACKOFF to 0 ms.
 2> if the Random Access Response contains a Random Access Preamble identifier corresponding to the transmitted PREAMBLE_INDEX (see subclause 5.1.3):
  3> consider this Random Access Response reception successful;
 2> if the Random Access Response reception is considered successful:
  3> if the Random Access Response includes RAPID only:
   4> consider this Random Access procedure successfully completed;
   4> indicate the reception of an acknowledgement for the SI request to upper layers;

3> else:
   4> if 'multiple preamble transmission' has been signalled:
      5> stop transmitting remaining preambles, if any;
   4> apply the following actions for the Serving Cell where the Random Access Preamble was transmitted:
      5> process the received Timing Advance Command (see subclause 5.2);
      5> indicate the ra-PreambleInitialReceivedTargetPower and the amount of power ramping applied to the latest preamble transmission to lower layers (i.e. (PREAMBLE_POWER_RAMPING_COUNTER−1)*powerRampingStep);
      5> process the received UL grant value and indicate it to the lower layers;
   4> if the Random Access Preamble was not selected by the MAC entity among the common PRACH preambles:
      5> consider the Random Access procedure successfully completed.
   4>else:
      5> set the TEMPORARY_C-RNTI to the value received in the Random Access Response;
      5> if this is the first successfully received Random Access Response within this Random Access procedure:
         6> if the transmission is not being made for the CCCH logical channel:
            7> indicate to the Multiplexing and assembly entity to include a C-RNTI MAC CE in the subsequent uplink transmission;
         6> obtain the MAC PDU to transmit from the Multiplexing and assembly entity and store it in the Msg3 buffer.
1> if ra-Response Window expires, and if the Random Access Response containing Random Access Preamble identifiers that matches the transmitted PREAMBLE_INDEX has not been received; or
1> if bfr-ResponseWindow expires and if the PDCCH addressed to the C-RNTI has not been received:
   2> consider the Random Access Response reception not successful;
   2> increment PREAMBLE_TRANSMISSION_COUNTER by 1;
   2> if PREAMBLE_TRANSMISSION_COUNTER=ra-PreambleTx-Max+1:
      3> if the Random Access Preamble is transmitted on the SpCell:
         4> indicate a Random Access problem to upper layers;
      3> else if the Random Access Preamble is transmitted on a SCell:
         4> consider the Random Access procedure unsuccessfully completed;
   2> if in this Random Access procedure, the Random Access Preamble was selected by MAC among the common PRACH preambles:
      3> select a random backoff time according to a uniform distribution between 0 and the PREAMBLE_BACKOFF;
      3> delay the subsequent Random Access Preamble transmission by the backoff time;
   2> perform the Random Access Resource selection procedure (see subclause 5.1.2).

The MAC entity may stop ra-ResponseWindow (and hence monitoring for Random Access Response(s)) after successful reception of a Random Access Response containing Random Access Preamble identifiers that matches the transmitted PREAMBLE_INDEX.

HARQ operation is not applicable to the Random Access Response transmission.

5.1.5 Contention Resolution

Contention Resolution is based on either C-RNTI on PDCCH of the SpCell or UE Contention Resolution Identity on DL-SCH.

Once Msg3 is transmitted, the MAC entity shall:
   1> start the ra-ContentionResolutionTimer and restart the ra-ContentionResolutionTimer at each HARQ retransmission;
   1> monitor the PDCCH while the ra-ContentionResolutionTimer is running regardless of the possible occurrence of a measurement gap;
   1> if notification of a reception of a PDCCH transmission is received from lower layers:
      2> if the C-RNTI MAC CE was included in Msg3:
         3> if the Random Access procedure was initiated by the MAC sublayer itself or by the RRC sublayer and the PDCCH transmission is addressed to the C-RNTI and contains an UL grant for a new transmission; or
         3> if the Random Access procedure was initiated by a PDCCH order and the PDCCH transmission is addressed to the C-RNTI:
            4> consider this Contention Resolution successful;
            4> stop ra-ContentionResolutionTimer;
            4> discard the TEMPORARY_C-RNTI;
            4> consider this Random Access procedure successfully completed.
      2> else if the CCCH SDU was included in Msg3 and the PDCCH transmission is addressed to its TEMPORARY_C-RNTI:
         3> if the MAC PDU is successfully decoded:
            4> stop ra-ContentionResolutionTimer;
            4> if the MAC PDU contains a UE Contention Resolution Identity MAC CE; and
            4> if the UE Contention Resolution Identity in the MAC CE matches the CCCH SDU transmitted in Msg3:
               5> consider this Contention Resolution successful and finish the disassembly and demultiplexing of the MAC PDU;
               5> set the C-RNTI to the value of the TEMPORARY_C-RNTI;
               5> discard the TEMPORARY_C-RNTI;
               5> consider this Random Access procedure successfully completed.
            4> else
               5> discard the TEMPORARY_C-RNTI;
               5> consider this Contention Resolution not successful and discard the successfully decoded MAC PDU.
   1> if ra-ContentionResolutionTimer expires:
      2> discard the TEMPORARY_C-RNTI;
      2> consider the Contention Resolution not successful.
   1> if the Contention Resolution is considered not successful:
      2> flush the HARQ buffer used for transmission of the MAC PDU in the Msg3 buffer;
      2> increment PREAMBLE_TRANSMISSION_COUNTER by 1;

2> if PREAMBLE_TRANSMISSION_COUNTER= preambleTransMax+1:
   3> indicate a Random Access problem to upper layers.
2> select a random backoff time according to a uniform distribution between 0 and the PREAMBLE_BACK-OFF;
2> delay the subsequent Random Access Preamble transmission by the backoff time;
2> perform the Random Access Resource selection procedure (see subclause 5.1.2).

5.1.6 Completion of the Random Access Procedure

Upon completion of the Random Access procedure, the MAC entity shall:
1> discard explicitly signalled ra-PreambleIndex, if any;
1> flush the HARQ buffer used for transmission of the MAC PDU in the Msg3 buffer.

In NR, the carrier bandwidth could be much larger (e.g., up to 400 MHz) as compared to LTE (e.g., up to 20 MHz). Considering that a UE may not be capable of supporting the full bandwidth of a carrier, the concept of a bandwidth part (BWP) is introduced. A UE is not required to receive any downlink (DL) signals outside a frequency range which is configured to the UE. One or multiple BWP configurations for each component carrier can be semi-statically signaled to a UE. The configuration of a BWP may include information to indicate a numerology (e.g., sub-carrier spacing), frequency location (e.g., center frequency) and bandwidth (e.g., number of Physical Resource Blocks (PRBs). Each BWP is associated with a specific numerology (e.g., sub-carrier spacing, CP type). A UE expects at least one DL BWP and one uplink (UL) BWP to be active among the set of configured BWPs for a given time instant. A UE is only assumed to receive/transmit within active DL/UL BWP(s) using the associated numerology. There is an initial active DL/UL BWP pair to be valid for a UE until the UE is explicitly (re)configured with BWP(s) during or after a RRC connection is established. In NR Release-15, for a UE, there is at most one active DL BWP and at most one active UL BWP at a given time for a serving cell. For each serving cell of the UE, one or more DL BWPs and one or more UL BWPs can be configured by a dedicated RRC for a UE. NR supports the case that a single scheduling downlink control information (DCI) can switch the UE's active BWP from one to another (of the same link direction) within a given serving cell.

RAN1 has further agreed that a dedicated timer is supported for a timer-based active DL BWP (or DL/UL BWP pair) switching to the default DL BWP (or default DL/UL BWP pair). According to RAN1 agreements, for a paired spectrum (e.g., frequency-division duplex (FDD)), the UE starts the dedicated timer when it switches its active DL BWP to a DL BWP other than the default DL BWP, and the UE restarts the dedicated timer to the initial value when it successfully decodes a DCI to schedule a Physical Downlink Shared Channel (PDSCH) in its active DL BWP. When the dedicated timer expires, the UE switches its active DL BWP to the default DL BWP regardless of which BWP was used as the active BWP previously. For an unpaired spectrum (e.g., Time-division duplex (TDD)), one DL BWP and one UL BWP form a pair, and they are switched jointly. Alternatively, for an unpaired spectrum, the UE restarts the dedicated timer to the initial value when it successfully decodes a Downlink Control Information (DCI) to schedule Physical Uplink Shared Channel(s) (PUSCH(s)) in its active DL/UL BWP pair. The default DL BWP could be optionally configured to the UE for a serving cell (e.g., Primary Cell (PCell) and/or Secondary Cell (SCell)). For a PCell, if there is no default DL BWP configured, the default DL BWP is the initial active DL BWP (i.e., the BWP used to perform initial access). If a default DL BWP is configured, the default DL BWP could be the same or different from the initial active DL BWP. For a SCell, the Radio Resource Control (RRC) signaling for a SCell configuration/reconfiguration indicates the first active DL BWP and/or the first active UL BWP, which will be considered as active when the SCell is activated. The default DL BWP (if configured) could be the same or different from the first active DL BWP.

One purpose of introducing the dedicated timer (herein referred to as "BWP inactivity timer" or "BWP timer" below) is for reducing UE power-consumption. When there is traffic on a serving cell, the network (NW) may schedule the UE and switch the UE's active BWP from the default BWP to a wide-bandwidth BWP in order to increase data throughput. The BWP inactivity timer will thus be started and restarted accordingly. When there is no traffic for a period of time, the timer expires and the UE switches the active BWP back to the default BWP without any NW signaling. The default BWP could be a narrow-bandwidth BWP, and the UE only needs to monitor for Physical Downlink Control Channel (PDCCH) occasions on the default BWP with reduced power-consumption. The NW can even configure the default BWP with less frequent PDCCH occasions for further reduction in the UE's power-consumption. Another purpose of the BWP inactivity timer is to provide a fallback mechanism for error handling (e.g., if the UE is not able to receive any NW signaling for a long time).

In RAN2, it was agreed that BWP switching cannot occur during Random Access (RA) procedure for Radio Resource Control (RRC) Connection establishment. Also, the network does not trigger BWP switching during Contention-free RA. When the UE initiates a RA procedure, it also stops the BWP inactivity timer to prevent autonomous BWP switching caused by the timer expiry. The intention of the above-disclosed agreements is not to interrupt the on-going RA procedure by DL and/or UL BWP switching. If the UE Medium Access Control (MAC) entity receives a PDCCH for BWP switching while a RA procedure is ongoing in the MAC entity, it is up to the UE implementation to determine whether to perform activation/deactivation of a BWP or ignore the PDCCH for BWP switching. If the UE MAC entity decides to perform BWP switching, the UE MAC entity shall stop the ongoing RA procedure and initiate a RA procedure on the newly activated BWP. If the UE MAC decides to ignore the PDCCH for BWP switching, the MAC entity shall continue with the ongoing RA procedure on the active BWP.

Figure 5:
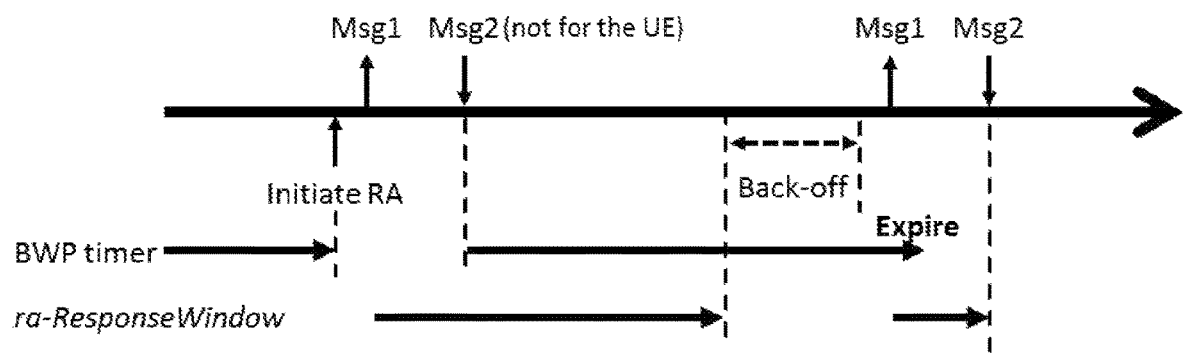
FIG. 5 illustrates a possible situation showing a bandwidth part (BWP) timer is started due to receiving a PDCCH for Msg2 but the Msg2 does not contain a RAR for the UE before the expiry of ra-ResponseWindow.

According to RAN1 agreements and NR MAC Running TS as disclosed in 3GPP TS 38.321 V2.0.0, the UE starts or restarts the BWP timer associated with the active BWP of a Serving Cell when a PDCCH indicating downlink assignment is received. This does not preclude the case when a PDCCH indicating a downlink assignment for Random Access Response (RAR, also called Msg2) or for Msg4 is received during RA procedure. As a result, the BWP timer may expire during the ongoing RA procedure and thus the UE needs to switch to the default DL BWP, which would interrupt the ongoing RA procedure on the current active DL BWP and thus is not an expected UE behavior. Taking a Contention-based RA procedure as an example, after transmitting the Msg1, the UE starts to monitor the PDCCH of a Serving Cell (e.g., SpCell) for Msg2 reception. When a PDCCH for Msg2 is successfully decoded, the associated BWP timer is started. If the received Msg2 does not contain any RA Preamble identifier corresponding to the Msg1 preamble index, the UE will not consider RAR reception successful and will continue monitoring PDCCH until ra-Response Window expires. After the ra-Response Window expires, the UE may delay the Msg1 re-transmission according to the Backoff Indicator (if received in the Msg2), and then the UE monitors the PDCCH for Msg2 again. Thus, it is possible that the associated BWP timer may expire before the successful reception of the next Msg2. FIG. 5 illustrates an example for the above case.

Figure 6:
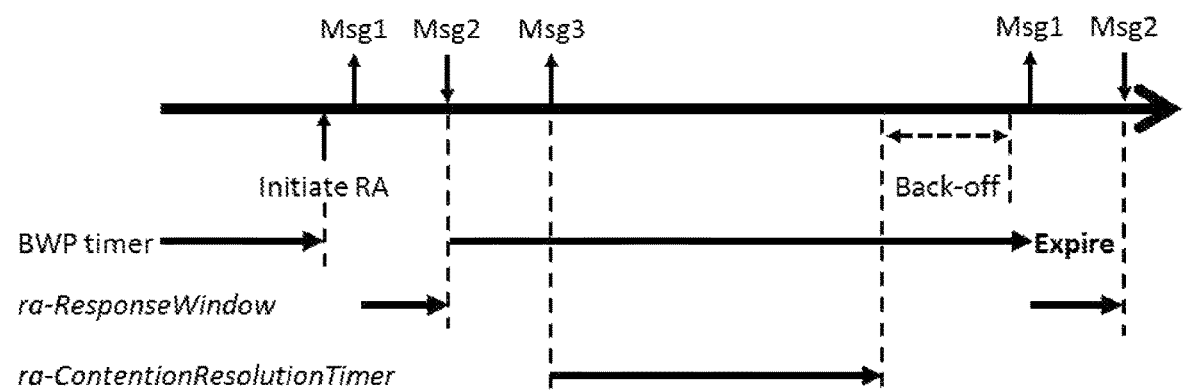
FIG. 6 illustrates a possible situation showing a BWP timer is started due to receiving a PDCCH for Msg2 but the UE does not receive Msg4 before expiry of ra-ContentionResolutionTimer.

A similar situation may also occur for Msg4 reception. For example, after transmitting Msg3, the UE starts to monitor the PDCCH for Msg4. In case the associated BWP timer is already started, e.g. by PDCCH for Msg2, if the UE does not receive any PDCCH for Msg4 before the expiry of ra-ContentionResolutionTimer, the UE may delay the Msg1 re-transmission according to the Backoff Indicator (if received in the Msg2) and then the UE monitors the PDCCH for the Msg2 again. In case the RA procedure is triggered by, for example, an uplink data arrival, if the UE receives a PDCCH for Msg4 but the PDCCH is a downlink assignment rather than an uplink grant, the UE cannot consider Contention Resolution successful. In this situation, the BWP timer is still started due to the reception of the PDCCH indicating a downlink assignment. The ra-ContentionResolutionTimer may expire before the success of Contention Resolution for the above two cases and the UE may delay the Msg1 re-transmission according to the Backoff Indicator (if received in the Msg2), and the UE then monitors the PDCCH for the Msg2 again. It is thus possible that the associated BWP timer may expire before the successful reception of the next Msg2. FIG. 6 illustrates an example for the case of not receiving Msg4 before the expiry of ra-ContentionResolutionTimer.

In addition, for an unpaired spectrum (e.g., TDD), the UE restarts the BWP timer associated with a Serving Cell when a PDCCH indicates an uplink grant is successfully received. This does not preclude the case when a PDCCH indicating an uplink grant for Msg3 retransmission is received, which may also result in timer expiry for a Contention-based RA. For example, after transmitting Msg3, the UE starts to monitor a PDCCH for Msg4 as well as Msg3 retransmission. If the UE successfully decodes a PDCCH for Msg3 retransmission, the associated BWP timer is started. The ra-ContentionResolutionTimer may expire before the success of Contention Resolution, and the UE may delay the Msg1 re-transmission according to the Backoff Indicator (if received in the Msg2). The UE then monitors the PDCCH for Msg2 again. Thus, it is possible that the associated BWP timer expires before the successful reception of the next Msg2.

Although the NW can configure a large enough timer value for the BWP inactivity timer to avoid timer expiry during RA procedure, a value too large for the BWP inactivity timer is not good in terms of reducing power consumption for the UE. In the worst case, the timer may become useless (i.e., it never expires before receiving a NW signalling).

To solve the above issue, the UE can stop the timer when performing Msg1/Msg 3 transmission or retransmission. Because the timer may be started when receiving a PDCCH for Msg2 reception, the UE should stop the timer after receiving Msg2. The UE could stop the timer upon Msg3 first transmission. Alternatively, the UE could stop the timer upon Msg3 retransmission. For a contention-based RA, if Contention Resolution fails, the UE will re-transmit Msg1 later and thus should stop the timer if the timer is started due to Msg4 reception. Alternatively, the UE could stop the timer upon Msg1 first transmission. In another alternative, the UE could stop the timer upon Msg1 retransmission. In one alternative, the UE may stop the timer if the active BWP of the Serving Cell is not the default BWP. Alternatively, the UE may not stop the timer if the active BWP of the Serving Cell is the default BWP.

Although this solution can avoid any possibility of an unexpected timer expiry during Msg1/3 re-transmission and Msg2/4 reception or re-reception, the timer will be started and stopped several times during RA procedure.

Another possible solution to the above issue is the UE does not start the timer if it successfully decodes a PDCCH during the RA procedure. In order not to start and stop the timer several times during RA procedure, another solution is to not to start the timer if the UE successfully decodes (receives) a PDCCH during the RA procedure. For example, the UE should not start the timer if it receives a PDCCH indicating a downlink assignment for Msg2 reception. For example, the UE should not start the timer if it receives a PDCCH indicating an uplink grant for Msg3 re-transmission. For example, the UE should not start the timer if it receives a PDCCH indicating a downlink assignment for Msg4 reception. As used above, "during a RA procedure" means that the RA procedure is still on-going and is not considered completed. After completion of the RA procedure (or if there is no ongoing RA procedure), the UE should follow normal BWP operation, for example, start or restart the BWP timer when the UE successfully decodes a PDCCH indicating a downlink assignment (or an uplink grant).

Figure 7:
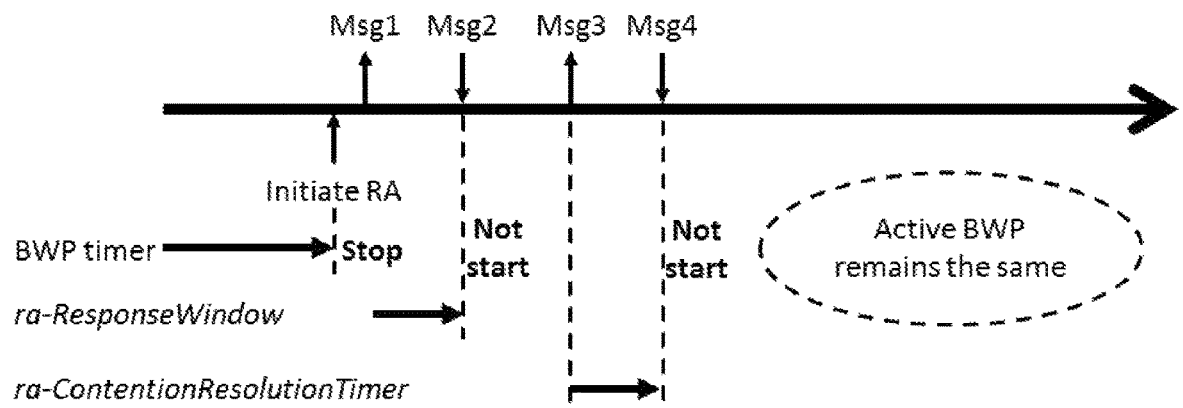
FIG. 7 illustrates a possible situation showing an active BWP remains the same after completion of the RA procedure if the BWP timer is stopped and not started during the RA procedure.
Figure 8:
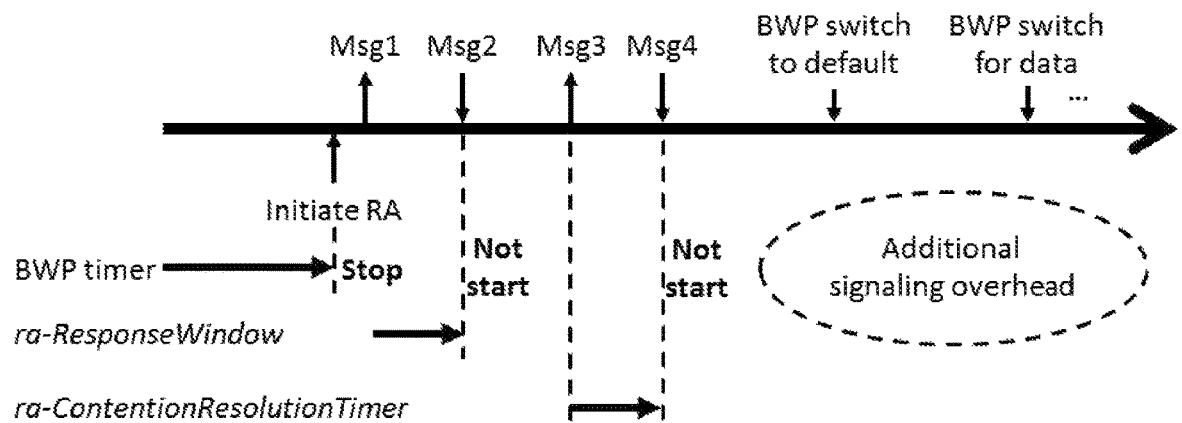
FIG. 8 illustrates a possible situation showing a UE receiving a BWP switching command after completion of the RA procedure but then DL data arrives immediately, which is unpredictable.

Through the above solution, the UE can safely complete the RA procedure (especially for Contention-based RA procedure) without any interruption caused by the expiry of the BWP inactivity timer. However, another issue may occur in which the UE may initiate a RA procedure due to the arrival of uplink data. If the UE stops the BWP timer upon initiating a RA procedure and/or during a RA procedure, there would be no chance to perform autonomous BWP switching after completion of the RA procedure. This would result in additional power consumption if the active DL/UL BWP is not the default DL/UL BWP. Although the NW can later switch the UE's active BWP to the default BWP, this would result in additional signalling overhead. If (unpredictable) UL/DL data comes later, the NW may decide to switch the UE's BWP again, which would result in unnecessary BWP switching on the UE side. FIGS. 7 and 8 illustrate examples of these issues.

One solution to the above issue is to start the timer upon and/or after the completion of the RA procedure. The UE could start the timer when the contention-based RA procedure is considered successfully completed. The UE could start the timer when a contention-free RA procedure is considered successfully completed. The UE may start the timer if the active BWP is not the default BWP. Alternatively, the UE may not start the timer if the active BWP is the default BWP. The network may configure one value of the BWP timer per serving cell or one value of the BWP timer per DL BWP (for a paired spectrum) or one value of the BWP timer per DL/UL BWP pair (for an unpaired spectrum). Although the issue is mainly concerned about UL data arrival, this solution is also applicable to DL data arrival.

Additionally, the above-disclosed solution can also be applied to multiple active DL BWPs or multiple active DL/UL BWP pairs in a UE, which may be supported in future releases. In the case of multiple active DL BWPs in a UE, there could be one BWP timer started for each active DL BWP so that the active DL BWP would be deactivated when the corresponding BWP timer expires. In the case of multiple active DL/UL BWP pairs in a UE, there could be one BWP timer started for each active DL/UL BWP pair so that the active DL/UL BWP pair would be deactivated when the corresponding BWP timer expires. The network may configure one value of the BWP timer per serving cell or one value of the BWP timer per DL BWP or one value of the BWP timer per DL/UL BWP pair. The UE stops the corresponding BWP timer upon initiating a RA procedure on an active UL BWP and an active DL BWP (or on an active DL/UL BWP pair in case of unpaired spectrum) and then the UE starts the timer upon/after successful completion of the RA procedure.

If the RA procedure is initiated on a Special Cell (SpCell) (i.e., a PCell or PSCell), the transmission of a Msg1 or Msg3 and reception of a Msg2 or Msg4 are all performed on that SpCell. For a NW-initiated (e.g., through a PDCCH order) RA procedure on a Secondary Cell (SCell), the Msg1 is transmitted on the SCell while Msg2 is received on the SpCell. In addition, there may be an UE-initiated RA procedure on the SCell in NR (e.g., for beam establishment and/or recovery purposes). The expiry of the BWP inactivity timer on either the SpCell or the SCell may interrupt the RA procedure.

To solve the above issue, when performing a RA procedure across two Serving Cells, both BWP inactivity timers (if configured) should be stopped and not started. For example, when UE receives a PDCCH order triggering RA procedure on a SCell, both the BWP timer of the SCell and the BWP timer of the SpCell should be stopped. For example, when UE performs Msg1 transmission or retransmission on a SCell, both the BWP timer of the SCell and the BWP timer of the SpCell should be stopped. For example, when UE receives a PDCCH addressed to RA-RNTI for Msg2 on the SpCell, both the BWP timer of the SCell and the BWP timer of the SpCell should not be started. Both the SCell and the SpCell here belong to the same Cell Group (e.g. Master Cell Group or Secondary Cell Group).

After completion of the RA procedure, both the BWP timer of the SCell performing Msg1 transmission and the BWP timer of the SpCell belonging to the same Cell Group could be started. The UE may start the timer if the active BWP of the Serving Cell is not the default BWP. The UE may not start the timer if the active BWP of the Serving Cell is the default BWP.

In one exemplary method, the PDCCH may be addressed to the C-RNTI or RA-RNTI. The PDCCH may include a downlink assignment. The PDCCH may include an UL grant. The PDCCH may or may not be transmitted via a candidate beam. The PDCCH may include a downlink control information (DCI). The PDCCH may indicate a Physical Downlink Shared Channel (PDSCH). The PDCCH may indicate a Physical Uplink Control Channel (PUSCH).

Figure 9:
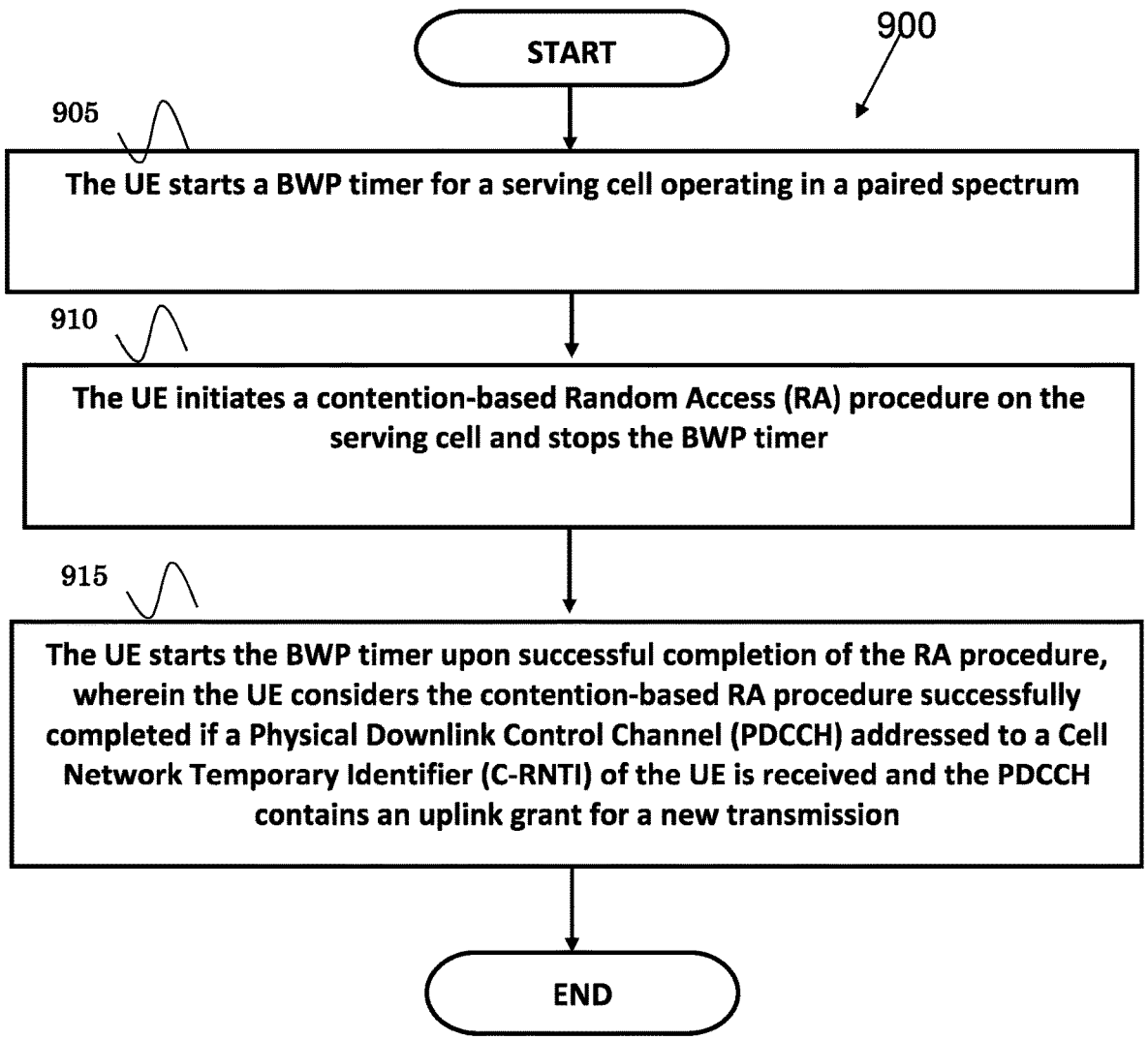
FIG. 9 is a flow diagram for one exemplary embodiment from the perspective of a UE.

FIG. 9 is a flow chart 900 according to one exemplary embodiment from the perspective of a UE. In step 905, the UE starts a BWP timer for a serving cell operating in a paired spectrum. In step 910, the UE initiates a contention-based Random Access (RA) procedure on the serving cell and stops the BWP timer. In step 915, the UE starts the BWP timer upon successful completion of the RA procedure, wherein the UE considers the contention-based RA procedure successfully completed if a Physical Downlink Control Channel (PDCCH) addressed to a Cell Network Temporary Identifier (C-RNTI) of the UE is received and the PDCCH contains an uplink grant for a new transmission.

In another method, the UE does not starting the BWP timer upon successful completion of the RA procedure, if an active downlink (DL) BWP associated with the BWP timer upon successful completion of the RA procedure is either a DL BWP indicated by Default-DL-BWP (in case Default-DL-BWP is configured) or an initial DL BWP (in case Default-DL-BWP is not configured).

In another method, the BWP timer is associated with an active downlink (DL) BWP of the Serving Cell, and wherein upon expiry of the BWP timer, the UE performs BWP switching to either a BWP indicated by a Default-DL-BWP if the Default-DL-BWP is configured for the Serving Cell or an initial DL BWP if the Default-DL-BWP is not configured for the Serving Cell.

In another method, the Serving Cell is a special cell, a primary cell, or a primary secondary cell.

In another method, the contention-based RA procedure is initiated due to the uplink data arrival.

In another method, the UE does not start or restart the BWP timer for the Serving Cell when receiving a PDCCH indicating a downlink assignment for a random access response reception or an uplink grant for Msg3 transmission during the contention-based RA procedure.

In another method, Msg3 is a message transmitted on an uplink shared channel (UL-SCH) containing a C-RNTI Medium Access Control (MAC) control element (CE) as part of the contention-based RA procedure.

In another exemplary method, the UE initiates a RA procedure on a first Serving Cell. The UE states a first BWP timer for the first Serving Cell when successfully decoding a PDCCH on the first Serving Cell at the first time during the RA procedure. The UE stops the first BWP timer associated with the first Serving Cell when re-transmitting a first message on the first Serving Cell during the RA procedure.

In another exemplary method, for the RA procedure, in the event a Msg1 transmission and a Msg2 reception are performed on different Serving Cells, namely the first Serving Cell and a second Serving Cell, the UE stops a second BWP timer for the second Serving Cell when re-transmitting the first message on the first Serving Cell during the RA procedure, wherein the UE receives the Msg2 on the second Serving Cell.

In another exemplary method, the UE does not stop the first and/or the second BWP timer during the RA procedure if an active BWP of the first/second Serving Cell during the RA procedure is a specific BWP.

In another exemplary method, the UE also stops the first and/or second timer associated with the first and/or second Serving Cell when transmits the first message at the first time on the first and/or second Serving Cell during the RA procedure.

In one or more of the above-disclosed methods, the first message is a Msg1 of the RA procedure.

In one or more of the above-disclosed methods, the first message is a Msg3 of the RA procedure.

In another exemplary method, the UE initiates a Random Access (RA) procedure on a first Serving Cell, and the UE does not start or restart the BWP timer for the first Serving Cell when successfully decoding a PDCCH on the first Serving Cell during the RA procedure.

In another exemplary method, for the RA procedure, in case a Msg1 transmission and a Msg2 reception are performed on different Serving Cells, namely the first Serving Cell and a second Serving Cell, the UE does not start or restart a BWP timer for the second Serving Cell when successfully decoding a PDCCH on the second Serving Cell during the RA procedure, wherein the UE receives the Msg2 on the second Serving Cell.

In one or more of the above-disclosed methods, the UE starts or restarts the associated BWP timer for a specific case.

In another exemplary method, the specific case is receiving a PDCCH indicating downlink assignment when there is no ongoing RA procedure on the associated Serving Cell.

In another exemplary method, the specific case is receiving a PDCCH indicating uplink grant when there is no ongoing RA procedure on the associated Serving Cell.

In another exemplary method, the specific case is receiving a PDCCH for BWP switching when there is no ongoing RA procedure on the associated Serving Cell.

In yet another exemplary method, the UE starts a first BWP timer for a first Serving Cell. The UE initiates a Random Access (RA) procedure on the first Serving Cell and stopping the first BWP timer. The UE starts the first BWP timer upon successful completion of the RA procedure.

In another exemplary method, for the RA procedure, in case a Msg1 transmission and a Msg2 reception are performed on different Serving Cells, namely the first Serving Cell and a second Serving Cell, the UE starts a second BWP timer for the second Serving Cell upon completion of the RA procedure, wherein the UE receives the Msg2 on the second Serving Cell.

In another exemplary method, the UE does not start the first and/or second BWP timer upon completion of the RA procedure if an active BWP of the first/second Serving Cell upon completion of the RA procedure is a specific BWP.

In one or more of the above-disclosed methods, the BWP timer is associated with one active DL BWP of one Serving Cell.

In one or more of the above-disclosed methods, the BWP timer is associated with one active DL/UL BWP pair of one Serving Cell.

In one or more of the above-disclosed methods, the RA procedure is associated with one active DL BWP of one Serving Cell.

In one or more of the above-disclosed methods, the RA procedure is associated with one active UL BWP of one Serving Cell.

In one or more of the above-disclosed methods, the RA procedure is associated with one active DL/UL BWP pair of one Serving Cell.

In one or more of the above-disclosed methods, the Serving Cell is operated in a Frequency Division Duplex mode.

In one or more of the above-disclosed methods, the UE starts or restarts the associated BWP timer when the UE successfully decodes a PDCCH indicating downlink assignment.

In one or more of the above-disclosed methods, the expiry of the BWP timer triggers a BWP switching on the associated Serving Cell.

In one or more of the above-disclosed methods, the BWP timer will not expire if it is stopped or is not running.

In one or more of the above-disclosed methods, the BWP switching deactivates the active BWP of the Serving Cell and activates the specific BWP of the Serving Cell.

In one or more of the above-disclosed methods, the specific BWP is a default BWP or an initial BWP.

In one or more of the above-disclosed methods, the specific BWP is a BWP indicated by the Default-DL-BWP.

In one or more of the above-disclosed methods, the BWP is a downlink BWP, an uplink BWP, and a downlink-uplink BWP pair.

In one or more of the above-disclosed methods, the first Serving Cell is a SpCell or a SCell.

In one or more of the above-disclosed methods, the second Serving Cell is SCell.

In one or more of the above-disclosed methods, the first Serving and the second Serving Cell belong to a same Cell Group.

In one or more of the above-disclosed methods, the Cell Group is a Master Cell Group.

In one or more of the above-disclosed methods, the Cell Group is a Secondary Cell Group.

In one or more of the above-disclosed methods, the RA procedure is a Contention-based RA procedure.

In one or more of the above-disclosed methods, the RA procedure is a Contention-free RA procedure.

In one or more of the above-disclosed methods, the RA procedure is triggered in response to receiving a network signalling.

In one or more of the above-disclosed methods, the RA procedure is triggered without receiving the network signalling.

In one or more of the above-disclosed methods, the network signalling is a handover command, a PDCCH order, or a RRC message.

In one or more of the above-disclosed methods, the successfully decoded PDCCH indicates a downlink assignment for Msg2.

In one or more of the above-disclosed methods, the successfully decoded PDCCH indicates a downlink assignment for Msg4.

In one or more of the above-disclosed methods, the successfully decoded PDCCH indicates a downlink assignment for a downlink data rather than Msg2 or Msg4.

In one or more of the above-disclosed methods, the successfully decoded PDCCH indicates an uplink grant for Msg3.

In one or more of the above-disclosed methods, the successfully decoded PDCCH indicates an uplink grant for an uplink data rather than Msg3.

Referring back to FIGS. 3 and 4, in one embodiment, the device 300 includes a program code 312 stored in memory 310. The CPU 308 could execute program code 312 to enable the UE (i) to start a BWP timer for a serving cell; (ii) to initiate a contention-based Random Access (RA) procedure on the serving cell and stops the BWP timer; and (iii) to start the BWP timer upon success completion of the RA procedure, wherein the UE considers the contention-based RA procedure successfully completed if a Physical Downlink Control Channel (PDCCH) addressed to a Cell Network Temporary Identifier (C-RNTI) of the UE is received and the PDCCH contains an uplink grant for a new transmission.

Furthermore, the CPU 308 can execute the program code 312 to perform all of the above-described actions and steps or others methods described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a user equipment (UE), comprising:
   starting a bandwidth part (BWP) timer for a serving cell operating in a paired spectrum;
   initiating a contention-based Random Access (RA) procedure on the serving cell and stopping the BWP timer; and
   not starting the BWP timer upon successful completion of the contention-based RA procedure if an active downlink (DL) BWP associated with the BWP timer is either (a) a DL BWP indicated by Default-DL-BWP, or (b) an initial DL BWP.

2. The method of claim 1, wherein the UE considers the RA procedure successfully completed if a Physical Downlink Control Channel (PDCCH) addressed to a Cell Network Temporary Identifier (C-RNTI) of the UE is received and the PDCCH contains an uplink grant for a new transmission.

3. The method of claim 1, wherein the BWP timer is associated with an active downlink (DL) BWP of the serving cell.

4. The method of claim 3, wherein upon expiration of the BWP timer, the UE performs BWP switching to either a BWP indicated by a Default-DL-BWP if the Default-DL-BWP is configured for the serving cell or an initial DL BWP if the Default-DL-BWP is not configured for the serving cell.

5. The method of claim 1, wherein the serving cell is a special cell.

6. The method of claim 1, wherein the serving cell is a primary cell.

7. The method of claim 1, wherein the serving cell is a secondary cell.

8. The method of claim 1, wherein the RA procedure is initiated due to uplink data arrival.

9. The method of claim 1, further comprising:
not starting or restarting the BWP timer for the serving cell when receiving a PDCCH indicating a downlink assignment for a random access response reception.

10. The method of claim 1, further comprising not starting or restarting the BWP timer for the serving cell when receiving an uplink grant for Msg3 transmission during the RA procedure.

11. The method of claim 10, wherein Msg3 is a message transmitted on an uplink shared channel (UL-SCH) containing a C-RNTI Medium Access Control (MAC) control element (CE) as part of the RA procedure.

12. A user equipment (UE), comprising:
a processor;
a memory coupled to the processor, wherein the processor is configured to execute a program code to:
start a bandwidth part (BWP) timer for a serving cell operating in a paired spectrum;
initiate a contention-based Random Access (RA) procedure on the serving cell and stopping the BWP timer; and
not start the BWP timer upon successful completion of the contention-based RA procedure if an active downlink (DL) BWP associated with the BWP timer is either (a) a DL BWP indicated by Default-DL-BWP, or (b) an initial DL BWP.

13. The UE of claim 12, wherein the UE considers the RA procedure successfully completed if a Physical Downlink Control Channel (PDCCH) addressed to a Cell Network Temporary Identifier (C-RNTI) of the UE is received and the PDCCH contains an uplink grant for a new transmission.

14. The UE of claim 12, wherein the BWP timer is associated with an active downlink (DL) BWP of the serving cell, and wherein upon expiration of the BWP timer, the UE performs BWP switching to either a BWP indicated by a Default-DL-BWP if the Default-DL-BWP is configured for the serving cell or an initial DL BWP if the Default-DL-BWP is not configured for the serving cell.

15. The UE of claim 12, wherein the serving cell is a special cell, a primary cell, or a primary secondary cell.

16. The UE of claim 12, wherein the RA procedure is initiated due to uplink data arrival.

17. The UE of claim 12, wherein the processor is configured to execute a program code to:
not start or restart the BWP timer for the serving cell when receiving a PDCCH indicating a downlink assignment for a random access response reception or an uplink grant for Msg3 transmission during the RA procedure.

18. The UE of claim 17, wherein Msg3 is a message transmitted on an uplink shared channel (UL-SCH) containing a C-RNTI Medium Access Control (MAC) control element (CE) as part of the RA procedure.

* * * * *